US006997642B2

(12) United States Patent
Bishop, Jr.

(10) Patent No.: US 6,997,642 B2
(45) Date of Patent: Feb. 14, 2006

(54) GOLF COURSE ENVIRONMENTAL MANAGEMENT SYSTEM

(75) Inventor: Robert F. Bishop, Jr., Aiken, SC (US)

(73) Assignee: SubAir Systems, LLC, Graniteville, SC (US)

( * ) Notice: Subject to any disclaimer, the term of this patent is extended or adjusted under 35 U.S.C. 154(b) by 0 days.

(21) Appl. No.: 10/935,205

(22) Filed: Sep. 7, 2004

(65) Prior Publication Data

US 2005/0031416 A1 Feb. 10, 2005

Related U.S. Application Data

(63) Continuation-in-part of application No. 10/777,491, filed on Feb. 12, 2004.

(60) Provisional application No. 60/447,169, filed on Feb. 12, 2003, provisional application No. 60/447,218, filed on Feb. 12, 2003.

(51) Int. Cl.
*E02B 11/00* (2006.01)
*A01G 9/24* (2006.01)

(52) U.S. Cl. .......................... 405/37; 405/43; 405/45; 405/269; 47/1.01 R; 47/58.1 R; 137/78.3; 700/284; 239/63

(58) Field of Classification Search .................. 405/36, 405/37, 43, 45, 269, 258; 47/1.01 R, 1.01 F; 37/58.1 R; 137/78.1, 78.3, 79; 700/284; 239/63–65
See application file for complete search history.

(56) References Cited

U.S. PATENT DOCUMENTS

| 3,599,867 | A | * | 8/1971 | Griswold et al. | .......... 137/78.3 |
| 3,726,477 | A | * | 4/1973 | Shapiro | ........................ 239/70 |
| 4,194,691 | A | * | 3/1980 | Birnbach et al. | ............... 47/79 |
| 4,244,022 | A | * | 1/1981 | Kendall | ....................... 700/284 |
| 4,626,984 | A | * | 12/1986 | Unruh et al. | ................ 700/284 |
| 5,148,125 | A | | 9/1992 | Woodhead et al. | |
| 5,219,243 | A | * | 6/1993 | McCoy | ........................ 405/43 |
| 5,433,759 | A | | 7/1995 | Benson | |
| 5,507,595 | A | | 4/1996 | Benson | |
| 5,542,208 | A | | 8/1996 | Benson | |
| 5,596,836 | A | | 1/1997 | Benson | |
| 5,617,670 | A | | 4/1997 | Benson | |
| 5,634,294 | A | * | 6/1997 | Rohoza | ................... 47/58.1 R |
| 5,636,473 | A | | 6/1997 | Benson | |
| 5,752,784 | A | | 5/1998 | Motz et al. | |
| 5,924,238 | A | * | 7/1999 | Yanohara | ................. 47/1.01 F |

(Continued)

FOREIGN PATENT DOCUMENTS

JP          04051825      *   2/1992

*Primary Examiner*—Jong-Suk James Lee
(74) *Attorney, Agent, or Firm*—McNair Law Firm PA; Cort Flint

(57) ABSTRACT

The invention is a system for managing a plurality of areas of interest of a golf course. The system comprises a plurality of electromechanical subsystems and a programmable master control module. Each subsystem provides to a specific area at least one of air under pressure and a partial vacuum. In each area of interest, a local control module is responsive to a directive and to a datum. The local control module is configured to operate the subsystem and is in communication with the programmable master control module. The programmable master control module receives from at least two of the plurality of local control modules information representing a status of the respective specific area to which the local control module is dedicated, and in response to the information and to a command, the programmable master control module issues a directive to the local control module to operate the electromechanical subsystem.

48 Claims, 19 Drawing Sheets

U.S. PATENT DOCUMENTS

| | | |
|---|---|---|
| 5,944,444 A | 8/1999 | Motz et al. |
| 6,018,909 A | 2/2000 | Potts |
| 6,088,959 A | 7/2000 | Wait et al. |
| 6,220,957 B1 | 4/2001 | Clarkson |
| 6,273,638 B1 | 8/2001 | Clarkson |
| 6,364,628 B1 | 4/2002 | Potts et al. |

* cited by examiner

GOLF COURSE ENVIRONMENTAL MANAGEMENT SYSTEM

CROSS-REFERENCE TO RELATED APPLICATIONS

This application claims priority to and the benefit of U.S. provisional patent application Ser. No. 60/447,169, filed Feb. 12, 2003, U.S. provisional patent application Ser. No. 60/447,218, filed Feb. 12, 2003, and U.S. nonprovisional patent application Ser. No. 10/777,491, filed Feb. 12, 2004, now abandoned, each of which applications is incorporated herein by reference in its entirety. This application is related to an application entitled "Battery-Powered Air Handling System For Subsurface Aeration," which application was filed on Aug. 11, 2004, and which is subject to assignment to the same assignee of the present application.

FIELD OF THE INVENTION

The invention relates to subsurface aeration systems in general and particularly to a subsurface aeration system servicing a plurality of areas of interest of a golf course.

BACKGROUND OF THE INVENTION

In prior art systems for treating soil and turf by blowing and/or vacuuming through a duct network located underneath the turf, a low-pressure high-volume fan is typically used to move air into the soil profile or remove moisture from the soil profile. U.S. Pat. Nos. 5,433,759; 5,507,595; 5,542,208; 5,617,670; 5,596,836; and 5,636,473, the disclosure of each of which is incorporated herein by reference in its entirety, show different variations on equipment used for this purpose. Since a non-reversing fan always rotates in the same direction, changing the system from a blowing function to a vacuuming function requires disconnecting the duct network from the blowing outlet of the fan unit and connecting it to the vacuum inlet of the unit. In some variations, a 4-way valve is used to avoid the hassles involved with selectively connecting and disconnecting the duct network from the various ports of the fan unit. Manual operations limit the degree to which the process can be automated. In addition, considerable judgment is involved in knowing when to blow air into the duct network and when to remove air from the duct network by applying a partial vacuum. Blowing air into the duct network when there is too much moisture in the soil profile can severely damage parts of the turf.

More recently, U.S. Pat. No. 6,273,638, the disclosure of which is incorporated herein by reference in its entirety, disclosed additional features of an air handling system that includes an air handling device connectable to a duct network that is underneath a field having grass growing in it, at least one sensor disposed to measure a variable associated with the field, and a control unit connected to the air handling device to control operating parameters of the air handling device responsive to an output from the sensor. A heat exchanger is optionally part of the system. The variables associated with the field include temperature and moisture. The operating parameters of the air handling device include direction of the air flow, temperature of the air directed into the duct network, and the time of operation of the unit. The system optionally includes programmable control logic so that the sensor output automatically controls the operating parameters of the system. A computer with display is used to program the control logic, which can be done remotely over a modem or the internet. The sensor output can be viewed on the display to allow a user to manually control the operating parameters if desired.

What is lacking are systems that can be operated where power supplies have insufficient capacity, and systems that can handle a diversity of environmental parameters over disparate areas of interest.

SUMMARY OF THE INVENTION

In one aspect, the invention relates to a system for managing a plurality of areas of interest within a golf course. The system comprises a plurality of electromechanical subsystems, each subsystem dedicated to a specific area of the golf course. Each subsystem comprises a subsurface aeration conduit for providing to the specific area of the golf course at least one of air under pressure and a partial vacuum; an air pump in fluid communication with the subsurface aeration conduit, the air pump configured to provide at least one of air under pressure and a partial vacuum; a motor mechanically connected to the air pump; a local control module responsive to a directive and to a datum, the local control module operatively coupled to the motor; and at least one sensor that measures an environmental parameter, the at least one sensor in data communication with the local control module; and a programmable master control module in communication with each of the plurality of local control modules. The programmable master control module receives from at least two of the plurality of local control modules information representing a status of the respective specific area to which the local control module is dedicated, and in response to the information and to a command, the programmable master control module issues a directive to each of the local control modules to operate the electromechanical subsystem.

In one embodiment, the subsurface aeration conduit is a device used to supply air under pressure to or withdraw air under vacuum from the subsurface of the area of interest on the golf course. In one embodiment, the subsurface aeration conduit is a selected one of interconnecting perforated pipe, interconnecting porous pipe and channels formed by a placement of spacing devices. In one embodiment, the spacing devices comprise trays.

In one embodiment, the motor is an electric motor. In one embodiment, the programmable master control module is a selected one of a programmable computer, a programmable logic controller (PLC), and a programmable industrial controller. In one embodiment, the programmable master control module is in communication with a selected one of the plurality of local control modules by way of a selected one of a hard-wired communication link, a wireless communication link, and a fiber-optic communication link.

In one embodiment, the programmable master control module further comprises a connection to a communication network. In one embodiment, the communication network comprises a selected one of a telephone communication link, a wireless communication link, an optical communication link, and a packet-switched communication link.

In one embodiment, the system can communicate information over the selected communication link to a user at a remote location. In one embodiment, the system can receive a command over the selected communication link from a user at a remote location. In one embodiment, at least one of the local control modules further comprises a communication link accessible by way of a hand-held battery-powered device. In one embodiment, the hand-held battery-powered device is a selected one of a cellular telephone, a personal digital assistant (PDA), and a pocket personal computer (pocket PC).

In one embodiment, at least one electromechanical subsystem further comprises a reversing mechanism in fluid communication with the air pump and with the subsurface aeration conduit, the reversing mechanism configured to cause air to flow in a first flow direction to provide air under pressure, and configured to cause air to flow in a second flow direction to provide a partial vacuum. In one embodiment, the reversing mechanism is responsive to the local control module.

In one embodiment, at least one electromechanical subsystem further comprises an irrigation system configured to irrigate at least a portion of a selected one of the specific areas of the golf course. In one embodiment, the local control module is operatively coupled to the irrigation system. In one embodiment, the irrigation system further comprises at least one sprinkler. In one embodiment, the irrigation system is configured to control a flow rate of water. In one embodiment, the irrigation system is configured to add substances to irrigation water. In one embodiment, the substances that the irrigation system is configured to add to irrigation water comprise at least one of a nutrient for a plant, an anti-fungal agent, and a chemical.

In one embodiment, the at least one sensor that measures an environmental parameter comprises a sensor that measures at least one of a temperature, a moisture content, an illumination, a chemical concentration, and a motion.

In one embodiment, the programmable master control module comprises a data recording and analysis module. In one embodiment, the data recording and analysis module is configured to record a selected one of a parameter relating to aeration, a parameter relating to irrigation, an operating parameter of an air pump, a temperature, a moisture content, a parameter relating to an additive applied to irrigation water, and a time in one embodiment, the data recording and analysis module is configured to analyze one or more parameters relating to aeration, to irrigation, to operation of an air pump, to a temperature, to a moisture content, to an additive applied to irrigation water, and to a time. In one embodiment, the data recording and analysis module is configured to compare a selected parameter to a setpoint. In one embodiment, the data recording and analysis module is configured to determine a status of at least one of the electromechanical subsystems.

In one embodiment, the programmable master control module further comprises a master display. In one embodiment, the master display exhibits a status of at least one of the electromechanical subsystems. In one embodiment, the status is a selected one of a time when the electromechanical subsystem begins to operate, a duration of operation of the electromechanical subsystem, an operating parameter of the electromechanical subsystem, a environmental condition, a fault condition, an alarm condition, a setpoint, and a directive. In one embodiment, the operating parameter of the electromechanical subsystem comprises a selected one of an electrical current, a pressure, a vacuum, a temperature, an air flow, and a water flow. In one embodiment, the environmental condition comprises a selected one of a soil temperature, an ambient temperature, a moisture content, an amount of solar radiation received in a specified time period, a soil salinity, and a detection of motion. In one embodiment, the ambient temperature is an ambient air temperature. In one embodiment, the moisture content is a selected one of a soil moisture content and an air humidity.

In one embodiment, the programmable master control module further comprises an input device for receiving commands from a user of the system. In one embodiment, the input device for receiving commands from a user of the system comprises a selected one of a keyboard, a key pad, a touch pad, a touch screen, a mouse, a joystick, a light pen, a pointing device, and a microphone. In one embodiment, the command is a command received from a user.

In one embodiment, the command is a command received from a computer program operating on the programmable master control module. In one embodiment, the temperature is a selected one of a soil temperature and an ambient temperature.

In one embodiment, at least one of the electromechanical subsystems further comprises a local display. In one embodiment, the local display exhibits a status of the electromechanical subsystem. In one embodiment, the status is a selected one of a time when the electromechanical subsystem begins to operate, a duration of operation of the electromechanical subsystem, an operating parameter of the electromechanical subsystem, a environmental condition, a fault condition, an alarm condition, and a directive. In one embodiment, the operating parameter of the electromechanical subsystem comprises a selected one of an electrical current, a pressure, a vacuum, an air flow, and a water flow. In one embodiment, the environmental condition comprises a selected one of a soil temperature, an ambient temperature, a moisture content, an amount of solar radiation received in a specified time period, a soil salinity, and a detection of motion. In one embodiment, the ambient temperature is an ambient air temperature. In one embodiment, the moisture content is a selected one of a soil moisture content and an air humidity.

In one embodiment, the local control module is implemented as a virtual local control module on the programmable master control module.

In one embodiment, the areas of interest comprise at least a plurality of one or more golf greens, one or more fairways, one or more tee boxes, one or more walkways, one or more gallery viewing areas, one or more driving ranges, one or more putting greens, and one or more practice areas.

In another aspect, the invention features a method of extracting water from a specific area of interest selected from a plurality of areas of interest within a golf course. The method comprises the steps of providing a subsurface aeration system at each of the plurality of areas of interest, and operating the subsurface aeration system at the specific area of interest to provide at least a partial vacuum when the moisture reading exceeds a setpoint value, thereby extracting water from the specific area of interest. Each subsurface aeration system comprises a conduit for providing to the specific area of the golf course at least a partial vacuum; an air pump in fluid communication with the subsurface aeration conduit, the air pump configured to provide at least a partial vacuum; a motor mechanically connected to the air pump; and at least one sensor that provide a moisture reading of the area of interest.

In one embodiment, the method further comprises the steps of providing a control module responsive to a directive and to the moisture reading, the control module coupled to the subsurface aeration system to control the operation thereof; and causing the subsurface aeration system to operate to extract water in response to the directive and to a determination that the moisture content exceeds the setpoint value.

In one embodiment, the method further comprises the steps of providing a programmable master control module in communication with the control module; receiving at the programmable master control module information sent from the control module, the information representing the moisture content; determining whether the moisture content exceeds the setpoint; and, if the determination is positive, issuing from the programmable master control module the directive to the local control module to operate the electromechanical subsystem.

In yet another aspect, the invention relates to a method of reducing a temperature of soil in a specific area of interest selected from a plurality of areas of interest within a golf course. The method comprises the steps of providing a subsurface aeration system at each of the plurality of areas of interest, and operating the subsurface aeration system to provide at least a partial vacuum when the ambient air temperature is lower than a first setpoint value, the soil temperature is higher than a second setpoint value, and the first setpoint value is less than the second setpoint value, thereby drawing ambient air through the specific area of interest to reduce a soil temperature thereof. Each subsurface aeration system comprises a subsurface aeration conduit for providing to the specific area of the golf course at least one of air under pressure and a partial vacuum; an air pump in fluid communication with the subsurface aeration conduit, the air pump configured to provide at least one of air under pressure and a partial vacuum; a motor mechanically connected to the air pump; at least one sensor that measures an ambient air temperature; and at least one sensor that measures a soil temperature.

In one embodiment, the at least one sensor that measures an ambient air temperature; and the at least one sensor that measures a soil temperature are a unitary structure.

In one embodiment, the method further comprises the steps of providing a control module responsive to a directive, to the ambient air temperature, and to the soil temperature, the control module coupled to the subsurface aeration system to control the operation thereof; determining whether the ambient air temperature is lower than a first setpoint value, the soil temperature is higher than a second setpoint value, and the first setpoint value is less than the second setpoint value; and, if the determination is positive, causing the local control module to operate the subsurface aeration system to reducing a temperature of soil. In one embodiment, the method further comprises repeating from time to time the determining step, and while the determination is positive, directing the local control module to operate the subsurface aeration system to reduce a temperature of soil.

In one embodiment, the method further comprises the steps of providing a programmable master control module in communication with the control module; receiving at the programmable master control module information sent from the control module, the information representing the ambient air temperature and the soil temperature; determining whether the ambient air temperature is lower than a first setpoint value, the soil temperature is higher than a second setpoint value, and the first setpoint value is less than the second setpoint value; and, if the determination is positive, issuing from the programmable master control module the directive to the local control module to operate the electromechanical subsystem to reduce a temperature of soil.

In one embodiment, the method further comprises repeating from time to time the determining step, and while the determination is positive, issuing from the programmable master control module the directive to the local control module to operate the electromechanical subsystem to reduce a temperature of soil.

In yet a further aspect, the invention features a method of reducing a temperature of soil in a specific area of interest selected from a plurality of areas of interest within a golf course. The method comprises the steps of providing a subsurface aeration system at each of the plurality of areas of interest, and operating the subsurface aeration system to provide air under pressure when the ambient air temperature is higher than a first setpoint value, the soil temperature is higher than a second setpoint value, the first setpoint value is higher than the second setpoint value, and the soil moisture content is less than a third setpoint value, thereby pushing air under pressure through the specific area of interest to reduce a soil temperature thereof Each subsurface aeration system comprises a subsurface aeration conduit for providing to the specific area of the golf course at least one of air under pressure and a partial vacuum; an air pump in fluid communication with the subsurface aeration conduit, the air pump configured to provide at least one of air under pressure and a partial vacuum; a motor mechanically connected to the air pump; at least one sensor that measures an ambient air temperature; at least one sensor that measures a soil temperature; and at least one sensor that measures a soil moisture content.

In one embodiment, at least two of the at least one sensor that measures an ambient air temperature, the at least one sensor that measures a soil temperature, and the at least one sensor that measures a soil moisture content are a unitary structure. In one embodiment, the method further comprises the steps of providing a control module responsive to a directive, to the ambient air temperature, to the soil temperature, and to the soil moisture content, the control module coupled to the subsurface aeration system to control the operation thereof determining whether the ambient air temperature is higher than a first setpoint value, the soil temperature is higher than a second setpoint value, the first setpoint value is higher than the second setpoint value, and the soil moisture content is less than a third setpoint value; and, if the determination is positive, causing the subsurface aeration system to operate to reducing a temperature of soil.

In one embodiment, the method further comprises repeating from time to time the determining step, and while the determination is positive, directing the local control module to operate the subsurface aeration system to reduce a temperature of soil.

In one embodiment, the method further comprises the steps of providing a programmable master control module in communication with the control module; receiving at the programmable master control module information sent from the control module, the information representing the ambient air temperature, the soil temperature and the soil moisture content; determining whether the ambient air temperature is higher than a first setpoint value, the soil temperature is higher than a second setpoint value, the first setpoint value is higher than the second setpoint value, and the soil moisture content is less than a third setpoint value; and, if the determination is positive, issuing from the programmable master control module the directive to the local control module to operate the electromechanical subsystem to reduce a temperature of soil.

In one embodiment, the method further comprises repeating from time to time the determining step, and while the determination is positive, issuing from the programmable master control module the directive to the local control module to operate the electromechanical subsystem to reduce a temperature of soil. In one embodiment, the air under pressure is ambient air that has been cooled by passing through at least a portion of the subsurface aeration conduit configured as a heat exchanger in contact with subsurface soil.

In still another aspect, the invention relates to a method of reducing a temperature of soil in a specific area of interest selected from a plurality of areas of interest within a golf course. The method comprises the steps of providing a subsurface aeration system at each of the plurality of areas of interest, and operating the subsurface aeration system to provide air under pressure when the ambient air temperature is lower than a first setpoint value, the soil temperature is higher than a second setpoint value, the first setpoint value is lower than the second setpoint value, and the soil moisture content is less than a third setpoint value, thereby pushing air under pressure through the specific area of interest to reduce a soil temperature thereof. Each subsurface aeration system comprises a subsurface aeration conduit for providing to the specific area of the golf course at least one of air under pressure and a partial vacuum; an air pump in fluid communication with the subsurface aeration conduit, the air pump configured to provide at least one of air under pressure and a partial vacuum; a motor mechanically connected to the air pump; at least one sensor that measures an ambient air temperature; at least one sensor that measures a soil temperature; and at least one sensor that measures a soil moisture content.

In a further aspect, the invention features a method of increasing a temperature of soil in a specific area of interest selected from a plurality of areas of interest within a golf course. The method comprises the steps of providing a subsurface aeration system at each of the plurality of areas of interest, and operating the subsurface aeration system to provide air under pressure when the ambient air temperature is greater than a first setpoint value, the soil temperature is less than a second setpoint value, the first setpoint value is higher than the second setpoint value, and the soil moisture content is less than a third setpoint value, thereby pushing ambient air through the specific area of interest to increase a soil temperature thereof. Each subsurface aeration system comprises a subsurface aeration conduit for providing to the specific area of the golf course at least one of air under pressure and a partial vacuum; an air pump in fluid communication with the subsurface aeration conduit, the air pump configured to provide at least one of air under pressure and a partial vacuum; a motor mechanically connected to the air pump; at least one sensor that measures an ambient air temperature; at least one sensor that measures a soil temperature; and at least one sensor that measures a soil moisture content.

In one embodiment, at least two of the at least one sensor that measures an ambient air temperature, the at least one sensor that measures a soil temperature, and the at least one sensor that measures a soil moisture content are a unitary structure. In one embodiment, the method further comprises the steps of providing a control module responsive to a directive, to the ambient air temperature, to the soil temperature, and to the soil moisture content, the control module coupled to the subsurface aeration system to control the operation thereof; determining whether the ambient air temperature is greater than a first setpoint value, the soil temperature is less than a second setpoint value, the first setpoint value is higher than the second setpoint value, and the soil moisture content is less than a third setpoint value; and, if the determination is positive, causing the subsurface aeration system to operate to increase a temperature of soil.

In one embodiment, the method further comprises repeating from time to time the determining step, and while the determination is positive, directing the local control module to operate the subsurface aeration system to increase a temperature of soil.

In one embodiment, the method further comprises the steps of providing a programmable master control module in communication with the control module; receiving at the programmable master control module information sent from the control module, the information representing the ambient air temperature, the soil temperature and the soil moisture content; determining whether the ambient air temperature is greater than a first setpoint value, the soil temperature is less than a second setpoint value, the first setpoint value is higher than the second setpoint value, and the soil moisture content is less than a third setpoint value; and, if the determination is positive, issuing from the programmable master control module the directive to the local control module to operate the electromechanical subsystem to increase a temperature of soil.

In one embodiment, the method further comprises repeating from time to time the determining step, and while the determination is positive, issuing from the programmable master control module the directive to the local control module to operate the electromechanical subsystem to increase a temperature of soil.

In a still further aspect, the invention relates to a method of increasing a temperature of soil in a specific area of interest selected from a plurality of areas of interest within a golf course. The method comprises the steps of providing a subsurface aeration system at each of the plurality of areas of interest, and operating the subsurface aeration system to provide at least a partial vacuum when the ambient air temperature is greater than a first setpoint value, the soil temperature is lower than a second setpoint value, and the first setpoint value is higher than the second setpoint value, thereby drawing ambient air through the specific area of interest to increase a soil temperature thereof. Each subsurface aeration system comprises a subsurface aeration conduit for providing to the specific area of the golf course at least one of air under pressure and a partial vacuum; an air pump in fluid communication with the subsurface aeration conduit, the air pump configured to provide at least one of air under pressure and a partial vacuum; a motor mechanically connected to the air pump; at least one sensor that measures an ambient air temperature; and at least one sensor that measures a soil temperature.

In one embodiment, the at least one sensor that measures an ambient air temperature and the at least one sensor that measures a soil temperature are a unitary structure.

In one embodiment, the method further comprises the steps of providing a control module responsive to a directive, to the ambient air temperature, and to the soil temperature, the control module coupled to the subsurface aeration system to control the operation thereof determining whether the ambient air temperature is greater than a first setpoint value, the soil temperature is lower than a second setpoint value, and the first setpoint value is higher than the second setpoint value; and, if the determination is positive, causing the subsurface aeration system to operate to increase a temperature of soil.

In one embodiment, the method further comprises repeating from time to time the determining step, and while the determination is positive, directing the local control module to operate the subsurface aeration system to increase a temperature of soil.

In one embodiment, the method further comprises the steps of providing a programmable master control module in communication with the control module; receiving at the programmable master control module information sent from the control module, the information representing the ambient air temperature and the soil temperature; determining whether the ambient air temperature is greater than a first setpoint value, the soil temperature is lower than a second setpoint value, and the first setpoint value is higher than the second setpoint value; and, if the determination is positive, issuing from the programmable master control module the directive to the local control module to operate the electromechanical subsystem to increase a temperature of soil.

In one embodiment, the method further comprises repeating from time to time the determining step, and while the determination is positive, issuing from the programmable master control module the directive to the local control module to operate the electromechanical subsystem to increase a temperature of soil.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
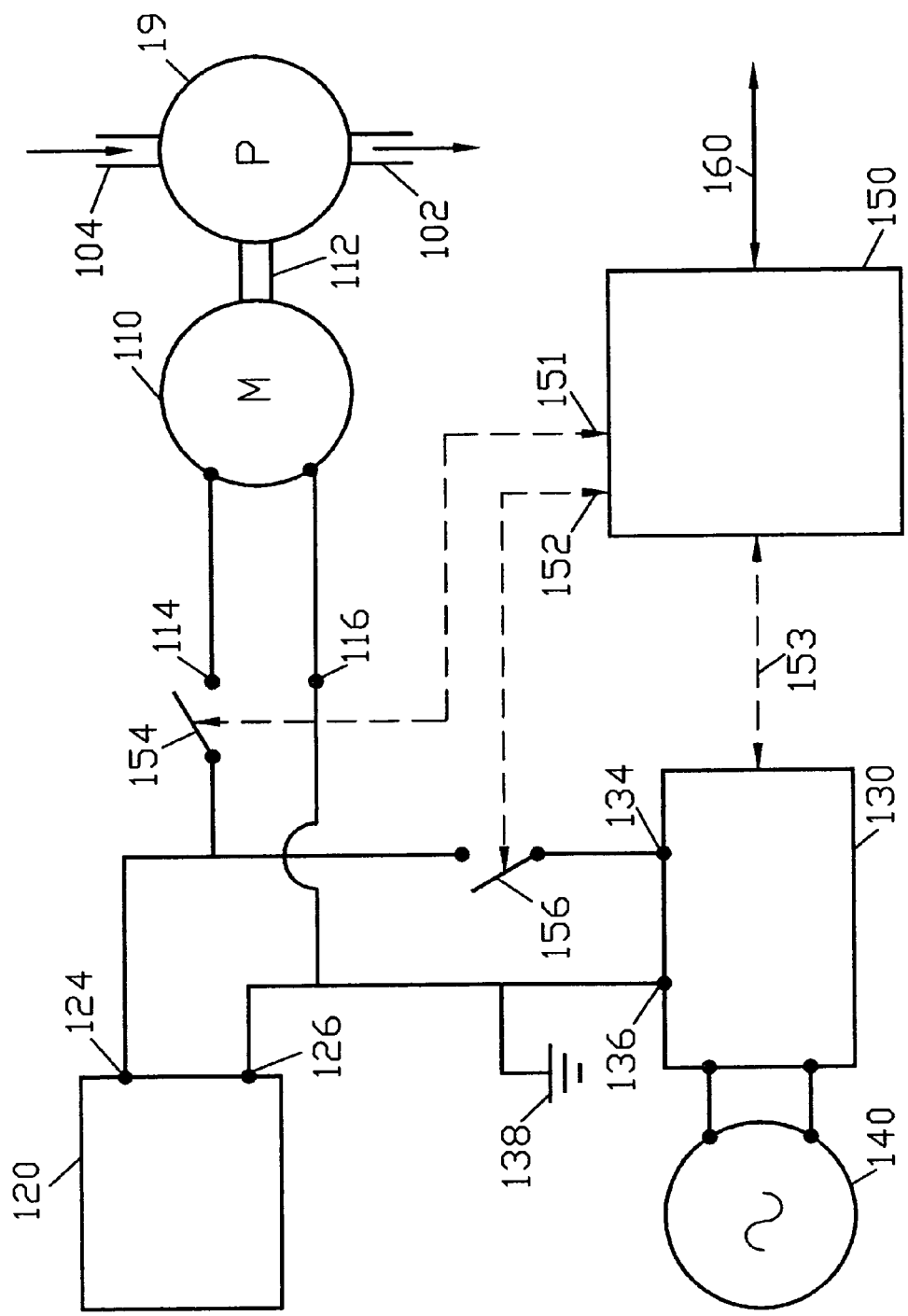
FIG. 1 is a high level block diagram of a storage battery system embodying principles of the invention.

In one embodiment, the systems according to principles of the invention are useful in operating subsurface aeration systems in locations where there is insufficient power provided by conventional grid-connected power supplies. In another embodiment, the systems according to principles of the invention are useful in managing the provision of such aeration services to a plurality of locations, for example areas having different requirements from one another.

As will be explained in greater detail hereinbelow, an example that illustrates the above advantages and solutions in the provision of subsurface aeration and associated services is discussed with reference to a golf course that has a plurality of greens or other areas of interest having different requirements. Different areas on a golf course can have differences in many features, such as in topography, in elevation, in exposure to the sun, and in other features such as water table level, or being subject to wind. For example, a first green is surrounded by a water hazard (for example, a green situated on an island surrounded by water and accessible by a footbridge or golf cart path); a second green is surrounded by sand traps; a third green is exposed to full sun for much or all of a day; and a fourth green is surrounded by trees that shade the green from direct sunlight for a considerable part of the day. Different greens may have different soil conditions and/or different elevations, some may be sloped or terraced; and some may be subject to other unique conditions, such as prevailing winds, or exposure to salt water or salt spray (for example a course situated at the ocean). Some greens or other areas of interest may be situated in areas where the power source that is available (such as a 110 Volt AC power line of modest capacity) is not sufficient to directly supply the electricity needed to operate the electromechanical systems that are needed.

A benefit that the systems of the invention provide includes the ability to provide subsurface aeration services even when a power source, such as an AC power line, that provides only insufficient capacity is present. Other benefits that the systems of the invention provide include the ability to manage the plurality of areas of interest from a central location, for example a club house; to automate the management functions; to allow monitoring of conditions at an area of interest or the status of an electromechanical system associated with an area of interest; to allow a user of the systems to assert local control when at the area of interest, as necessary; and to allow a user situated at an off-site location to access the systems, review the status, make determinations as to the appropriate actions to be taken, and as needed, institute and/or monitor control actions.

As can be seen in connection with prior art systems, one mobile pump can be utilized in the present system to service a number of greens on a golf course, a sports field and/or a leach field. Additionally, existing greens having in place drain systems can be easily retrofitted for almost immediate use in the present air treatment system. The valves servicing the system can be stationed in access pits some distance from the treatment site, and thus will not detract from the field of play.

Battery Powered Air Handling System

As mentioned hereinabove, in some situations, an area of interest that requires treatment with a subsurface aeration system according to the invention does not have a suitable power source available in its immediate vicinity. Alternating current (AC) motors that are suitable for operating a typical subsurface aeration system are often of a size in the 3 to 5 horsepower range, which require about 30 to 45 amps at 110 volts for their operation. However, the typical utility 110 volt power line used for irrigation satellites or for general purposes such as lighting, provides only about 10–15 amps, which is typically insufficient for operating subsurface aeration systems. As an example, on an older golf course, or in areas that are sufficiently remote from a high voltage power source, such as a 220 (or higher) volt supply, it is commonly the case that the available 110 volt AC power source when operating alone has insufficient capacity to drive a motor of suitable size to operate the air pump satisfactorily for the proper operation of the subsurface aeration system. According to principles of the invention, the subsurface aeration system in some embodiments is powered by a storage battery having sufficient capacity (e.g., high enough amp-hour rating and high enough discharge rate) to operate a DC motor that runs the air pump or blower of the system satisfactorily. In a preferred embodiment, the storage battery is a deep discharge battery. Those of ordinary skill will recognize that individual storage batteries having sufficient voltage and current capacity, as well as series and parallel combinations of storage batteries, can be used in practicing the invention. For example, such as 6 volt, 12 volt batteries (e.g., automotive batteries), 24 volt batteries (e.g., marine batteries), and other batteries of any convenient voltage can be employed in the systems according to principles of the invention. As an example, if a 48 volt system is desired, it is possible to connect eight (8) batteries of the 6 volt type in series, or one could use a different arrangement, such as 4 batteries of the 12 volt type in series. In one embodiment, eight 6 volt deep cycle batteries, such as U.S. Battery model 2200, available from U.S. Battery Manufacturing Co., 1895 Tobacco Road, Augusta, Ga. 30906, are used to provide a 48 volt compound storage battery. As is well understood by application of Kirchhoff's current and voltage laws, to increase the current capacity, if needed, one could build a compound battery system by connecting two or more "strings" of series-connected batteries in parallel, wherein each series "string" comprises batteries having a total voltage value that is substantially equal to every other "string" in the compound battery system. In view of the forthcoming change of automotive battery technology to batteries operating in the range of 36–42 volts, one can expect that batteries operating at those voltages will be come more economical, and can be foreseen as being applicable to the inventions described herein. In another preferred embodiment, the storage battery (or a plurality of storage batteries) provides a working voltage of 48 volts.

Figure 5:
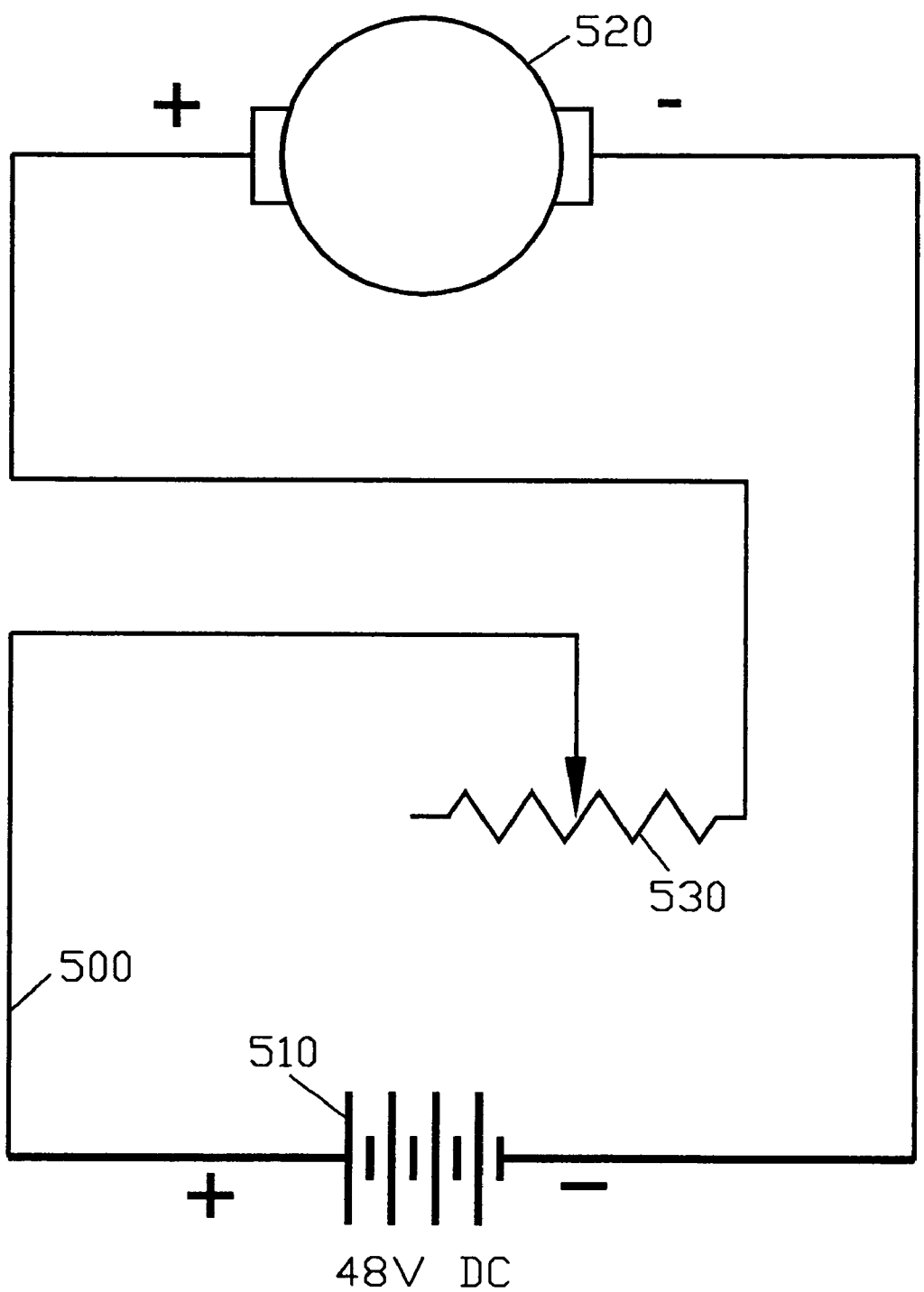
FIG. 5 is a schematic diagram showing a test circuit for a DC motor driven by a 48 volt battery, according to principles of the invention.

FIG. 1 is a high level block diagram of a system 100 employing a storage battery. In FIG. 1, a DC motor 110 is mechanically connected to a blower or air pump 19 by a shaft 112, which can include a transmission and/or clutch mechanism as is well known in the motor/blower arts. In some embodiments, the motor 110 is a Briggs and Stratton Etek™ permanent magnet Electric Motor System 48 volt motor. Other DC motors can be used in other embodiments. FIG. 5 is a schematic diagram 500 showing a test circuit for a DC motor 510 driven by a 48 volt battery 520. A rheostat 530 is connected between the battery 510 and the motor 520 so that a resistance can be introduced at start up, and removed as the motor begins to operate. The rheostat 530 comprises a variable resistor configured to handle a peak current of some tens to approximately 150 amps.

The DC motor comprises power terminals 114, 116 for operating the DC motor 110 when suitable DC voltage and current are applied thereto. In the embodiment shown in FIG. 1, a storage battery 120 is provided for providing DC power at the required current and voltage needed by the motor 110. In some embodiments, the storage battery 120 is a bank of batteries interconnected to supply a desired working voltage and a suitable current, such as a series-connected set of eight batteries, each battery being a six volt deep discharge lead acid battery, thereby providing a current of 45 to 60 amps at 48 volts nominal working voltage. In one embodiment, such a battery bank provides about 30 minutes of operating time in a period of about 210 minutes, or a duty cycle of about 15%. In some embodiments, the deep discharge batteries are discharged to only an extent of 30 to 40 percent of their working capacities, both to prolong their operating life, and to keep recharge time to acceptable values. The storage battery comprises terminals 124 and 126 that can be connected to motor terminals 114 and 116, respectively. In FIG. 1, the connection of terminal 124 and terminal 114 is shown as being accomplished by a single pole switch 154 which can be opened, disconnecting the storage battery from the motor 110, and which switch 154 can be closed, thereby connecting the storage battery 120 to the motor 110. For simplicity, the second connection between terminal 126 of the storage battery 120 and terminal 116 of the motor is shown without an intervening switch; those of ordinary skill in the electrical arts will understand that switch 154 could be replaced with a two pole switch that connects or disconnects, depending on its state, both of the connections between the storage battery 120 and the motor 110.

The battery 120 requires recharging, for example when a sufficiently long period of operation of the motor 110 and blower 19 has elapsed. Accordingly, the system of FIG. 1 further comprises a source of AC power 140, such as the above-mentioned 110 volt AC power source when operating alone has insufficient capacity to drive a motor of suitable size to operate the air pump 19 satisfactorily. In other embodiments, other sources of electrical power can be used in place of the source of AC power 140. Examples of other sources of electrical power include a solar cell array, a generator driven by an engine (such as engines that use gasoline, diesel, compressed gas, or natural gas as fuel), a wind turbine, and a fuel cell. The AC power source 140 is electrically connected to an AC-to-DC converter 130, such as a full- or half-wave rectifier circuit, with or without filtering. The preferred AC-to-DC converter 130 is a high efficiency full-wave rectifier with filtering. The terminals 134 and 136 of the AC-to-DC converter (or battery charger)

130 connect electrically with the corresponding terminal 124 and 126 of the storage battery 120. The AC power source 1140 and the AC-to-DC converter 130 when operative are configured to fully charge storage battery 120 to its rated capacity over a reasonable period of time, such as a period of tens of minutes to hours. In some embodiments, the battery charger comprises a transformer. In some embodiments, the transformer is part of the AC-to-DC converter 130. In some embodiments, the battery charger operates at an input voltage of 110 volts AC and draws 10 to 15 amps, while providing an output of 48 to 60 volts DC at 18 to 20 amps.

In FIG. 1, the connection of terminal 124 and terminal 134 is shown as being accomplished by a single pole switch 156 which can be opened, disconnecting the storage battery 110 from the AC-to-DC converter 130, and which switch 156 can be closed, thereby connecting the storage battery 120 to the AC-to-DC converter 130. For simplicity, the second connection between terminal 126 of the storage battery 120 and terminal 136 of the AC-to-DC converter 130 is shown without an intervening switch; those of ordinary skill in the electrical arts will understand that switch 156 could be replaced with a two pole switch that connects or disconnects, depending on its state, both of the connections between the storage battery 30 and the AC-to-DC converter 130. In one embodiment, the common connection of terminals 116, 126 and 136 is defined as ground 138. Alternatively, the voltage at the common connection of terminals 116, 126 and 136 can be shifted to any convenient value of voltage, using well-known circuitry.

FIG. 1 further indicates the presence of a control circuit 150 that is responsive to commands. The commands are communicated to the control circuit 150 over a communication line 160, which is at least unidirectional, and in some embodiments is bi-directional. The control circuit 150 is operatively coupled via bi-directional control and data line 151 to the storage battery 120 to control a connection of the storage battery 120 to provide power to the motor 110, for example by controlling the state of switch 154. The control circuit 150 in some embodiments receives information transmitted on bi-directional control and data line 151 about the condition or state of the storage battery 120 from local sensors, such as current and voltage sensors. In other embodiments, the current and voltage sensors include local logic capability, which can communicate with the control circuit 150 to inform it of a condition requiring attention, or the local logic capability can be configured to take corrective or remedial action as necessary. The control circuit 150 is also operatively coupled via bi-directional control and data line 152 to the battery charger 130 to control a connection of the storage battery 120 to the battery charger 130, for example by controlling the state of switch 156. In some embodiments, the battery charger 130 communicates a status or condition to the control circuit 150 using the bi-directional control and data line 152. In some embodiments, the battery charger 130 comprises local logical capability, which can communicate with the control circuit 150 to inform it of a condition requiring attention, or the local logic capability can be configured to take corrective or remedial action as necessary. In some embodiments, the control circuit 150 is also operatively coupled to the combination of AC power source 140 and AC-to-DC converter 130 by bi-directional control and data line 153, whereby the control circuit 150 can turn the combination of AC power source 140 and AC-to-DC converter 130 on and off as may be convenient or necessary, and data can be sent from the combination of AC power source 140 and AC-to-DC converter 130 to the control circuit 150 as necessary. As will be understood by those of ordinary skill, in the electronic control arts, the system in some embodiments includes feedback from the controlled components (e.g., storage battery 120, battery charger 130, motor 110) that provides the control circuit 150 data or information which are useful in performing control actions. In other embodiments, there is additionally control circuitry and logic at the component being controlled, which control circuitry and logic also has the capacity to perform control functions.

In one mode of operation (which we shall term "mode one"), the storage battery 120 alone is used to provide power to the motor 110. In a second mode of operation (which we shall term "mode two"), the storage battery 120 and the combination of the AC power source 140 and AC-to-DC converter 130 are both connected to the motor 110 to provide power thereto. In the second mode, the combination of AC power source 140 and AC-to-DC converter 130 can be understood to provide power that supplements the power being provided by the storage battery 120, thereby reducing the discharge rate that the storage battery 120 experiences, assuming that the operating point of the motor 110 in mode two is the same as would be the case under operation in mode one. Equivalently, one can understand the operation of the combination of AC power source 140 and AC-to-DC converter 130 as recharging the storage battery 120 while the storage battery 120 is being discharged because of the drain represented by the operation of the motor 110. In any event, the net effect is to extend the time of operation of the motor 110 above what would be possible using the storage battery 120 alone. Those of ordinary skill will also recognize that the system described above can be modified by the addition of additional storage batteries 120 and additional switching circuitry, so that a first storage battery 120 can provide power to motor 110 while a second storage battery 120 (not shown in FIG. 1) is being recharged by the combination of AC power source 140 and AC-to-DC converter 130. In some embodiments, during "mode two" operation when a golf green is wet, the storage battery provides approximately 35 to 45 amps to the DC motor and the battery charger provides up to 20 amps. In some embodiments, during "mode two" operation when a golf green is dry, the storage battery provides approximately 65 to 75 amps to the DC motor and the battery charger provides about 18 to 20 amps.

In some embodiments, the control circuit 150 is configured to disconnect the storage battery if the drain on the storage battery becomes too great (i.e., exceeds a defined current) such as is commonly achieved with a circuit breaker, or if the storage battery voltage falls below a specific lower threshold or setpoint voltage. In some embodiments, a 48 volt nominal working voltage system has a lower threshold voltage of 44 volts. In some embodiments, the control circuit 150 waits a defined period of time to permit a temporary fault to be cleared before acting, for example the control circuit 150 may have a 10 minute delay. In some embodiments, the control circuit 150 is configured to cause the battery charger to cease charging when a specific higher threshold voltage is attained.

In some embodiments, the operation of the system using the storage battery system 100 is as will now be described. The system is turned on and operated by any of a manual operation of a user, a timer, and a command issued by a user or a program operating a programmable computer system (e.g., a programmable master control module) such as a personal computer (PC), a personal digital assistant (PDA), a cellular telephone, a programmable logic controller (PLC), and industrial controller, whether directly connected to the system, or connected by way of a hard-wired communication link, a wireless communication link, a fiber-optic communication link, a communication network, a telephone communication link, an optical communication link, and a packet-switched communication link.

At system turn on, AC line voltage is provided to operate a DC relay and logic power supply. Typically, the power supply operates at 24 volts DC. A "start" sequence including a "soft start" current limitation to the blower motor is initiated. The DC motor in one embodiment is a brush motor, which represents a substantially zero impedance when not operating. In this embodiment, a starting resistor of approximately 0.3 ohm is initially switched into series connection between the DC motor and the storage battery, which resistor limits the initial current (or surge current) flowing to the motor to the order of 100 amps, e.g., 48 volts driving 0.3 ohms will cause 48/0.3=160 amps. A relay is provided to short out the resistor after a brief period, such as 1 second, once the motor begins to operate, at which time the windings have a back electromotive force present, which causes the current to maintain a finite value. The current draw through the motor is then determined by the load on the motor represented by the blower. In addition, a contactor between the charger and the storage battery is opened, so that the charger is reset to a "charge" state when the contactor is closed again. This operating condition is a "mode one" operating condition. In other embodiments, a solid state controller can be used to control the current supplied to the motor on startup, and to control the motor during operation. In yet another embodiment, it is optionally possible to start the motor without any "soft start" control by connecting the motor directly to the storage battery. In the instance where no soft start is used, stresses are placed both on the motor at startup and on the battery which has to supply a large surge current. In addition, starting the motor without a controlled acceleration places significant stresses on the coupling between the motor and the blower.

A short time, for example 5 seconds, after the motor begins to operate with the 0.3 ohm resistor shorted out, the contactor between the charger and the storage battery is closed, causing the battery charger to begin to provide charge to either or both of the storage battery and the DC motor, which is described hereinabove as a "mode two" operating condition. The DC motor drives the blower during which time charge is drained from the storage battery.

The control circuit comprises a device that monitors the current being drawn from the battery (e.g., a current monitor module). In one embodiment, a Hall effect toroidal coil sensor with built in adjustable sense level is used. The sensor senses DC current flow in a wire brought through a hole located in the center of the module. Current sensing is done by an internal Hall effect device. When the forward current flow goes above a pre-adjusted set point, the output goes high. When the forward current falls below the pre-adjusted set-point, the output goes low. A reverse current flow has no effect. The current sense set point may be in the range of 0–10, 0–100 or 0–200 Amp depending on the model selected. The sensor in one embodiment is a model CS880-100 DC current sensing module available from RBE Electronics, 714 Corporation Street, Aberdeen, S. Dak. 57401, which is described at the web site www.rbeelectronics.com/cs880.htm.

In another embodiment, a shunt of resistance R ohms is used, whereby a voltage V=IR is generated across the shunt in proportion to the current, I, flowing through the shunt. The power lost in the shunt is given by $I^2R$. For a shunt of sufficiently small resistance, even a current of 100 amps will result in a small power loss, for example 100×100×0.0001=10 watts for a resistance of 0.0001 ohm (e.g., 0.1 milliohm). Under these conditions, V=100×0.0001=0.01 volts or 10 millivolts, a readily discernable voltage. In some embodiments, a limiting current is 75 amps, which corresponds to a shunt voltage of 7.5 millivolts. If the limiting current value is reached, the control circuit can disconnect the motor from the storage battery and the battery charger, thereby turning the system off and protecting the storage battery. The control circuit can also disconnect the motor from the storage battery and the battery charger in the event that the storage battery voltage falls below a predefined lower threshold voltage, as described herein above.

The control circuit 150 in some embodiments comprises a storage battery discharge monitoring module. In some embodiments, the storage battery discharge monitoring module is a device that integrates with respect to time the amount of current drawn from the battery, for example by using the instantaneous values provided by the current monitor module. In one embodiment, a battery storage discharge monitoring module is implemented by using an analog-to-digital converter with a sample-and-hold circuit to periodically sample the shunt voltage IR described above and to provide a digital representation thereof, which is then processed by a programmable digital computer to derive the current I=V/R and to integrate by summation the value I×Δt, where Δt represents a time interval between current observations. In another embodiment, the shunt voltage is converted to a pulse train in a voltage controlled oscillator, and the pulses are counted, thereby providing an instantaneous measure of voltage V, and hence of current I. When the integrated value representing amp-hours reaches a threshold value, such as 30 amp-hours, the control circuit can shut off the motor and blower by disconnecting the storage battery/battery charger and the DC motor. In an alternative embodiment, the motor can be shut off after a specified time period, such as 30 minutes, without actually measuring the number of amp-hours of discharge current. In some embodiments, the time of operation can be estimated based on the environmental conditions of the area of interest, for example using a look-up table, which table can be generated by actual experience or can be generated by calculation using a mathematical model.

During operation, the control circuit can identify and can control the state of the various valves in the subsurface aeration system. For example, the four way reversing unit comprises valves that need to be opened or closed in the correct relationship so as to define a flow direction for air, thereby allowing the system to provide a selected one of air under pressure and a partial vacuum, as explained hereinabove. The control circuit identifies the state of each of the valves in the four way reversing unit. The state of one or more valves may be recorded in a machine readable memory as a truth table for each defined type of operation of the system. In some embodiments, the control circuit accesses the truth table to determine the correct valve configuration for the type of operation that is intended. The control circuit can thereby determine whether the subsurface aeration system is configured to deliver pressurized air or partial vacuum, or if the four way reversing valve is misconfigured (i.e., whether one or more of the valves thereof is in an undefined state). The control circuit compares the then-current configuration to the configuration needed for the type of operation that the system is supposed to be performing. As needed, the control circuit adjusts the valve positions or states to conform the system to the desired operation. In another embodiment, the control circuit uses a "brute force" configuration approach, in which it does not determine whether a valve is correctly or incorrectly configured, but merely issues commands to configure each valve according to a predefined set of configurations. The system can then be operated under the presumption that each valve is properly configured, whether it was so configured originally or not.

In normal operation, after the motor is turned off by disconnecting the storage battery/battery charger from it, the battery charger remains connected to the storage battery to recharge the storage battery. The battery charger remains in an operating ("on") state and recharges the storage battery until the storage battery is observed by the control circuit to be fully charged. The control circuit turns off the battery charger and disconnects the storage battery when the storage battery is fully charged. The state of charge of the storage battery can be monitored by observing any one of several operating parameters of the storage battery, such as the time rate of change of voltage, dv/dt, of the storage battery; the instantaneous voltage of the storage battery; or by measuring the amount of charge actually entering the battery, using the shunt method described hereinabove. When the storage battery is deemed to have been recharged, the battery charger is disconnected.

In some embodiments, the components of the power supply portion of the system, including the storage battery, the AC power source, the AC-to-DC converter, the various switches, relays and other interconnect hardware are all situated within enclosures that can be opened by authorized personnel, such as users of the system or individuals trained to install and repair the system, but not by unauthorized individuals. The presence of enclosures is a safety measure, and the enclosures in some embodiments are provided with safety switches (or limit switches) at locations such as doors or panels that can be opened, so that the system is disabled upon the opening of a door or panel of the enclosure. In some embodiments, there are provided jumpers or other devices for defeating an activated safety switch so that the electrical components can be tested by an authorized person even with a door open or with a panel removed, as is well known in the electrical arts. In some embodiments, ground fault circuit interrupter (GFCI) devices are provided at the 110 volt AC power mains to disable the system if an electrical fault occurs.

Figure 1A:
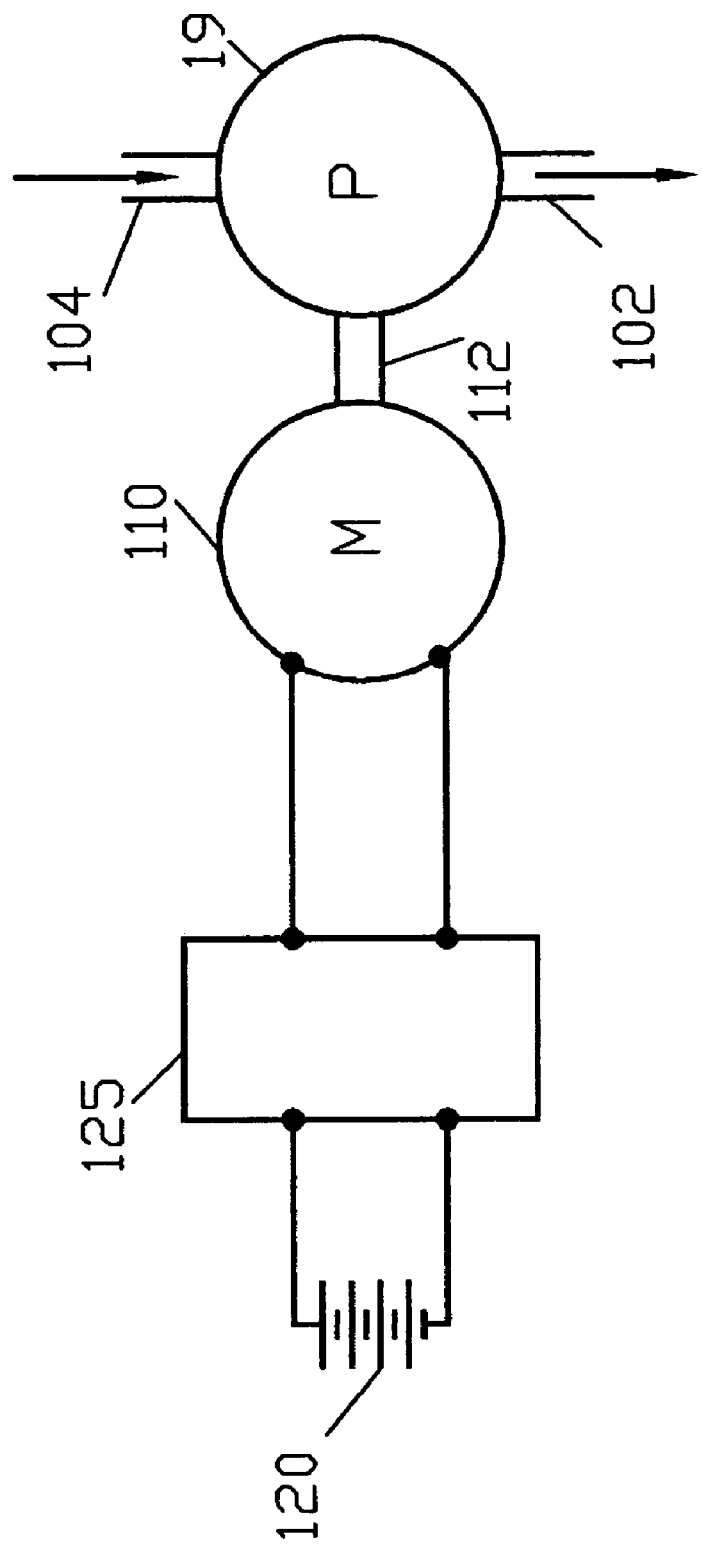
FIG. 1A is a high level block diagram illustrating an embodiment of a battery, a controller, a motor, and a blower, according to principles of the invention.

FIG. 1A is a high level block diagram illustrating an embodiment of a battery 120, a controller 125, a motor 110 and a blower 19. In some embodiments, the controller 125 is a soft start resistor and relay controls for switch the resistor into and out of the circuit. In some embodiments, the controller 125 is a rheostat and the necessary relay contacts. In some embodiments the controller is a solid state controller that can control the current provided to the motor so as to limit current surges and control motor speed and acceleration, for example a pulse width modulation device. In some embodiments, the controller 125 is a switch.

Figure 2:
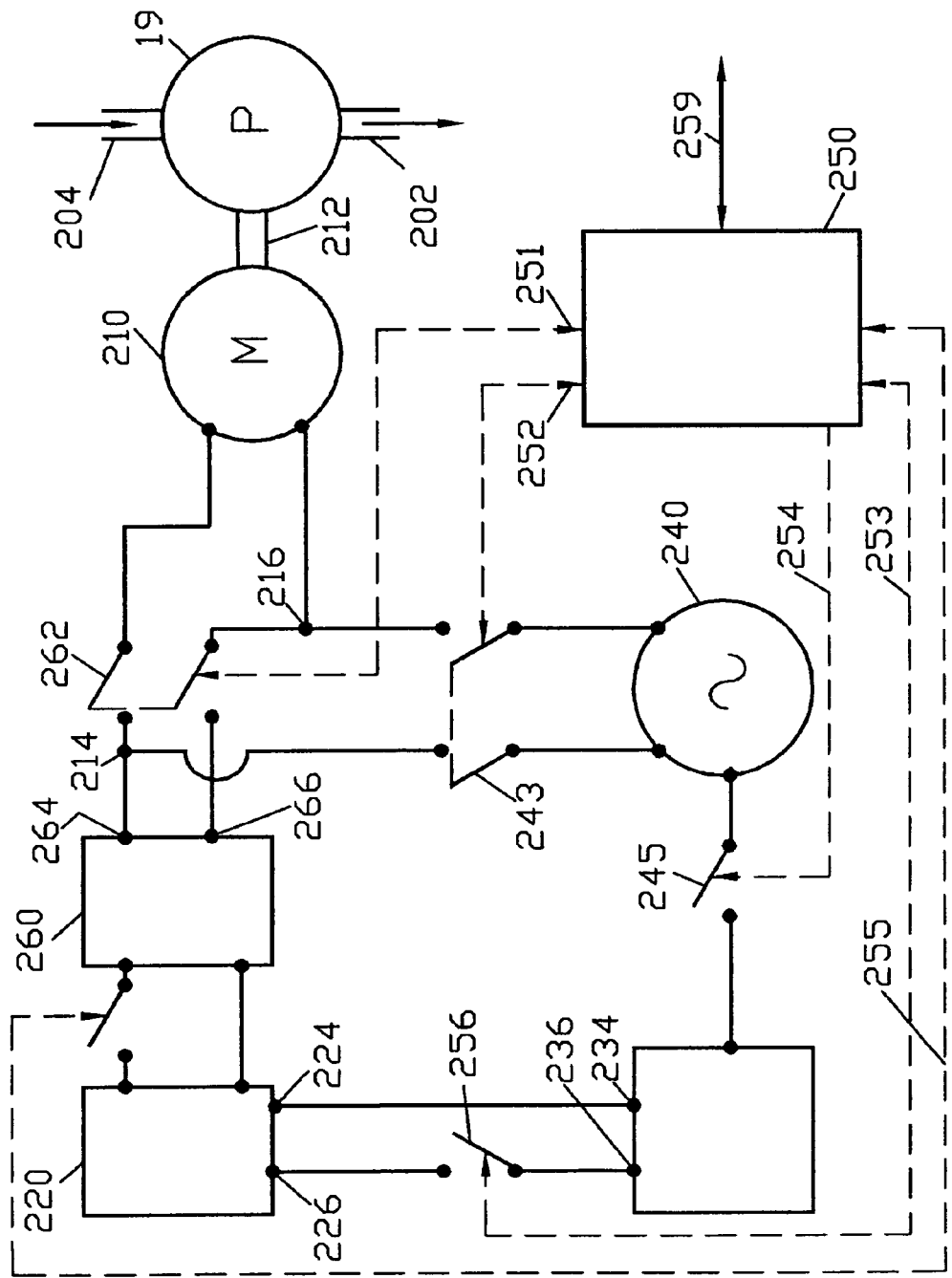
FIG. 2 is a high level block diagram of a second storage battery system embodying principles of the invention.

FIG. 2 is a high level block diagram of a second storage battery system 200 further comprising an inverter 260 and an AC motor 210. Again, the system of FIG. 2 comprises a source of AC power 240, such as the above-mentioned 110 volt AC power source when operating alone has insufficient capacity to drive a motor of suitable size to operate the air pump 19 satisfactorily.

In FIG. 2, an AC motor 210 is mechanically connected to a blower or air pump 19 by a shaft 212, which can include a transmission and/or clutch mechanism as is well known in the motor/blower arts. The blower or air pump 19 is connected by way of output line 202 and input line 204 to a subsurface aeration system that can provide at least one of air under pressure and a partial vacuum. The AC motor comprises power terminals 214, 216 for operating the AC motor 210 when suitable DC voltage and current are applied thereto. In the embodiment shown in FIG. 2, a storage battery 220 is provided for providing DC power to the inverter 260, which in turn provides the required current and voltage needed by the motor 210. The inverter 260 comprises terminals 264 and 266 that can be connected to motor terminals 214 and 216, respectively. In FIG. 2, the connection of terminals 264 and 266 to terminals 214 and 216 respectively is shown as being accomplished by a two pole switch 262 that connects or disconnects, depending on its state, both of the connections between the inverter 260 and the motor 210. The two pole switch 262 is controlled by the control circuit 250 via a bi-directional control and data line 251.

The battery 220 requires recharging, for example when a sufficiently long period of operation of the motor 210 and blower 19 has elapsed. The AC power source 240 is electrically connected to an AC-to-DC converter 230, such as a full- or half-wave rectifier circuit, with or without filtering. The preferred AC-to-DC converter 230 is a high efficiency full-wave rectifier with filtering. The terminals 234 and 236 of the AC-to-DC converter (or battery charger) 230 connect electrically with the corresponding terminal 224 and 226 of the storage battery 220. The AC power source 240 and the AC-to-DC converter 230 when operative are configured to fully charge storage battery 220 to its rated capacity over a reasonable period of time, such as a period of tens of minutes to hours.

In FIG. 2, the connection of terminal 224 and terminal 234 is shown as being accomplished by a single pole switch 256 which can be opened, disconnecting the storage battery 210 from the AC-to-DC converter 230, and which switch 256 can be closed, thereby connecting the storage battery 220 to the AC-to-DC converter 230. For simplicity, the second connection between terminal 226 of the storage battery 220 and terminal 236 of the AC-to-DC converter 230 is shown without an intervening switch; those of ordinary skill in the electrical arts will understand that switch 256 could be replaced with a two pole switch that connects or disconnects, depending on its state, both of the connections between the storage battery 30 and the AC-to-DC converter 230.

FIG. 2 further indicates the presence of a control circuit 250 that is responsive to commands. The commands are communicated to the control circuit over a communication line 259, which is at least uni-directional, and in some embodiments is bi-directional. The control circuit 250 is operatively coupled via bi-directional control and data line 255 to the storage battery 220 to control a connection of the storage battery 220 to the inverter 260, to provide power to the motor, for example by controlling the state of switch 258. The control circuit is also operatively coupled via bi-directional control and data line 253 to the battery charger 230 to control a connection of the storage battery 220 to the battery charger 230, for example by controlling the state of switch 256. In some embodiments, the control circuit 250 is also operatively coupled to the combination of AC power source 240 and AC-to-DC converter 230 by bi-directional control and data line 253, whereby the control circuit 250 can turn the combination of AC power source 240 and AC-to-DC converter 230 on and off as may be convenient or necessary. As will be understood by those of ordinary skill in the electronic control arts, the system in some embodiments includes feedback from the controlled components (e.g., storage battery 220, battery charger 230, motor 210)

that provides the control circuit 250 data or information which are useful in performing control actions. In other embodiments, there is additionally control circuitry and logic at the component being controlled, which control circuitry and logic also has the capacity to perform control functions.

In one mode of operation (which we shall term "mode one"), the storage battery 220 alone is used to provide power to the motor 210 by way of inverter 260. In a second mode of operation (which we shall term "mode two"), the storage battery 220 and the AC power source 240 are both connected to the motor 210 to provide power thereto. The AC power source 1240 is connected to the motor by way of a two-pole switch 243. The two pole switch 243 is controlled by the control circuit 250 via a bi-directional control and data line 252. In some embodiments, phase and frequency sensing hardware and/or software and control circuitry are provided to permit the synchronization of the phase and frequency of the AC power source and the output of the inverter 260 so that the power from the two sources adds and does not destructively interfere when operated in "mode two." In one embodiment, the inverter 260 comprises phase and frequency sensing hardware, and is configured to adjust its output to conform to the phase and frequency of the AC power source 240.

In the second mode, the AC power source 240 can be understood to provide power that supplements the power being provided by the storage battery 220 by way of the inverter 260, thereby reducing the discharge rate that the storage battery 220 experiences, assuming that the operating point of the motor 210 in mode two is the same as would be the case under operation in mode one. In an alternative embodiment, the operation of the combination of AC power source 240 and AC-to-DC converter 230 can be used to recharge the storage battery 220 while the storage battery 220 is being discharged by way of the inverter 260 because of the drain represented by the operation of the motor 210. In any event, the net effect is to extend the time of operation of the motor 210 above what would be possible using the storage battery 220 alone. Those of ordinary skill will also recognize that the system described above can be modified by the addition of additional storage batteries 220 and additional switching circuitry, so that a first storage battery 220 can provide power to motor 210 while a second storage battery 220 (not shown in FIG. 2) is being recharged by the combination of AC power source 240 and AC-to-DC converter 230.

The operation of the system using the AC motor of FIG. 2 is substantially similar to that using a DC motor, with certain obvious variations. The measurement of battery discharge current is measured between the storage battery and the inverter 260. There is no need for the 0.3 ohm starting resistor and all of the hardware and operating steps associated with that resistor are omitted.

The command that either of control circuit 150 of FIG. 1 or control circuit 250 of FIG. 2 receive can be a command generated by a programmable master control circuit, such as a programmable computer, a command generated by the control circuit itself based on a program or generated by a hard-wired logic circuit, or a command from a user. The various command scenarios will be discussed in greater detail hereinbelow.

At least one embodiment of the battery powered air handling system of the invention was constructed and tested, successfully demonstrating the principles of the invention. In this embodiment, a Briggs and Stratton DC motor was used to drive an aluminum blower fan. The air driven by the fan was carried by a conduit made from 8 inch diameter corrugated plastic pipe. Different caps were attached to the delivery end of the conduit to simulate various conditions of air impedance that the air handling system was expected to encounter. The caps included devices having fixed discharge surface areas, as well as a variable damper that could be set within a range of positions representing different impedances to air flow. The parameters that were measured included the battery voltage and current, the speed of the fan in revolutions per minute (RPM), the flow velocity of air in linear feet per minute, and the back pressure in inches of water. Air linear flow velocity was converted to cubic feet per minute (CFM) based on the size of the conduit.

Figure 3:
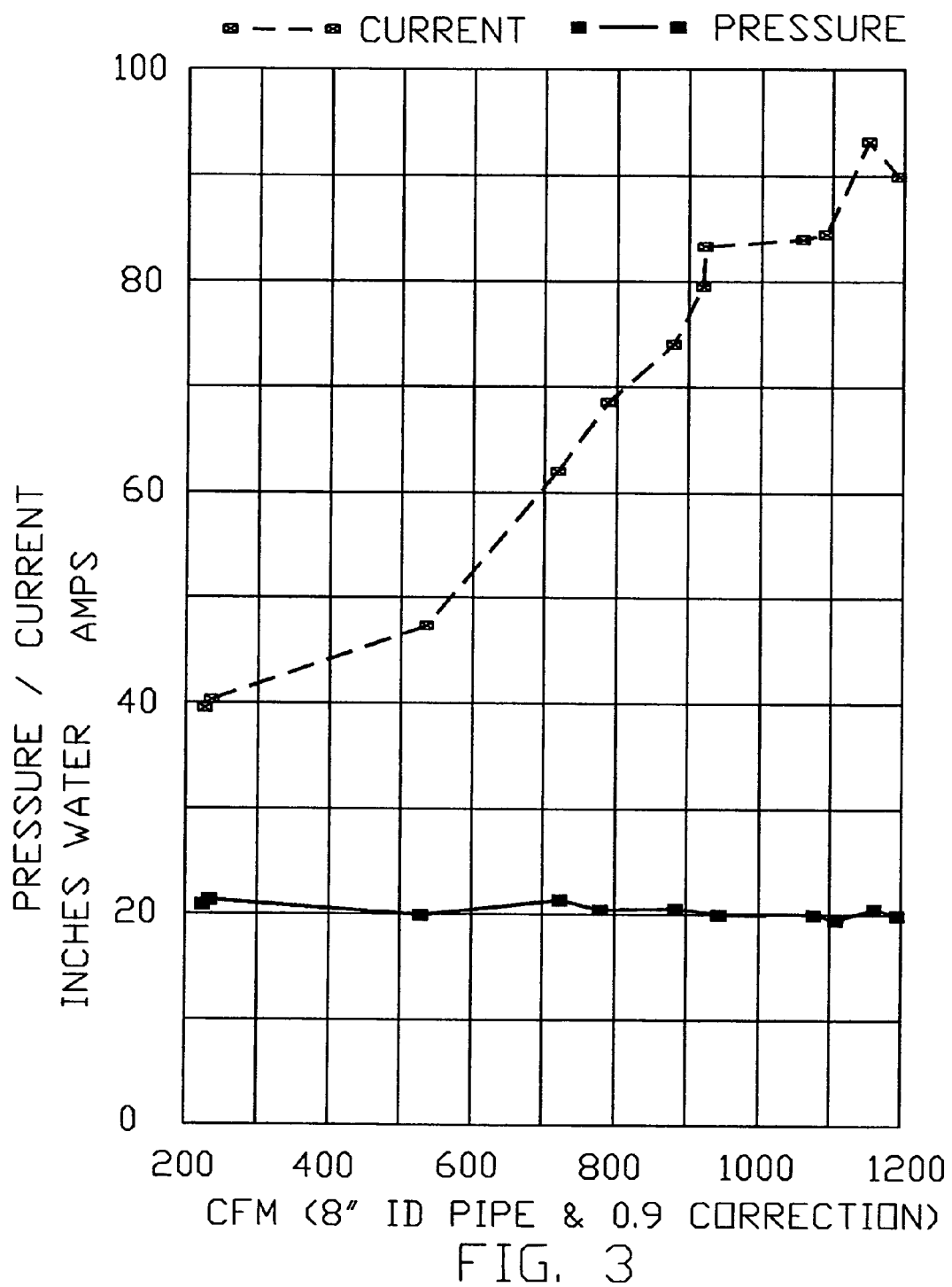
FIG. 3 is a graph of the observed values for electric current and for back pressure as a function of air flow delivered, according to principles of the invention.

FIG. 3 is a graph of the observed values for electric current and for back pressure as a function of air flow delivered. The pressure observed did not appreciably differ from 22 inches of water for flow rates ranging from about 200 CFM to about 1200 CFM. These results are satisfactory. The observed electric current varied in the range of about 38 amps at the 200 CFM flow rate to about 95 amps at the higher flow rates. The battery voltages observed were close to the nominal 48 volts under all test conditions, ranging from a high of about 51 volts at low flow rate to about 47 volts at higher flow rates. The motor efficiency was consistently in the 90 to 95 percent range, as computed from the electrical power supplied by the battery and the estimated torque power delivered by the motor. The motor parameters were not graphed.

Figure 4:
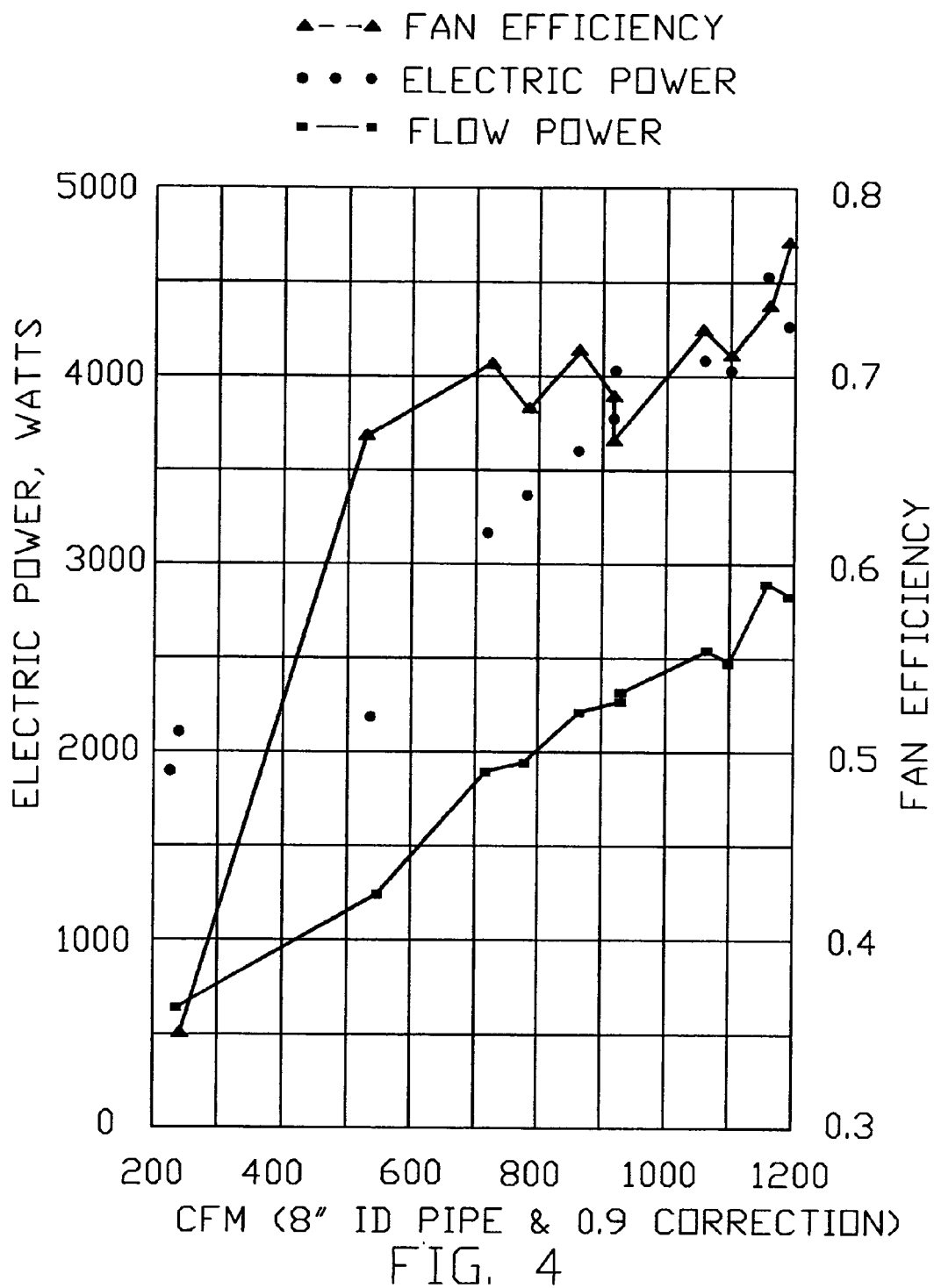
FIG. 4 is a graph of the calculated results for electric power consumed, power transmitted to drive the flowing air, and the efficiency of the fan as a function of air flow delivered, according to principles of the invention.

Using the observed operating parameters, values were computed for electric power consumed, power transmitted to drive the flowing air, and the efficiency of the fan, using standard calculations well known in the art and described in the technical literature. FIG. 4 is a graph of the calculated results for electric power consumed, power transmitted to drive the flowing air, and the efficiency of the fan as a function of air flow delivered. The fan efficiency at low flow rates of approximately 250 CFM are relatively low, in the range of 35 to 40 percent. The fan efficiency for higher flow rates (e.g., above about 550 CFM) is significantly higher, ranging from 67 to 77 percent.

Figure 6:
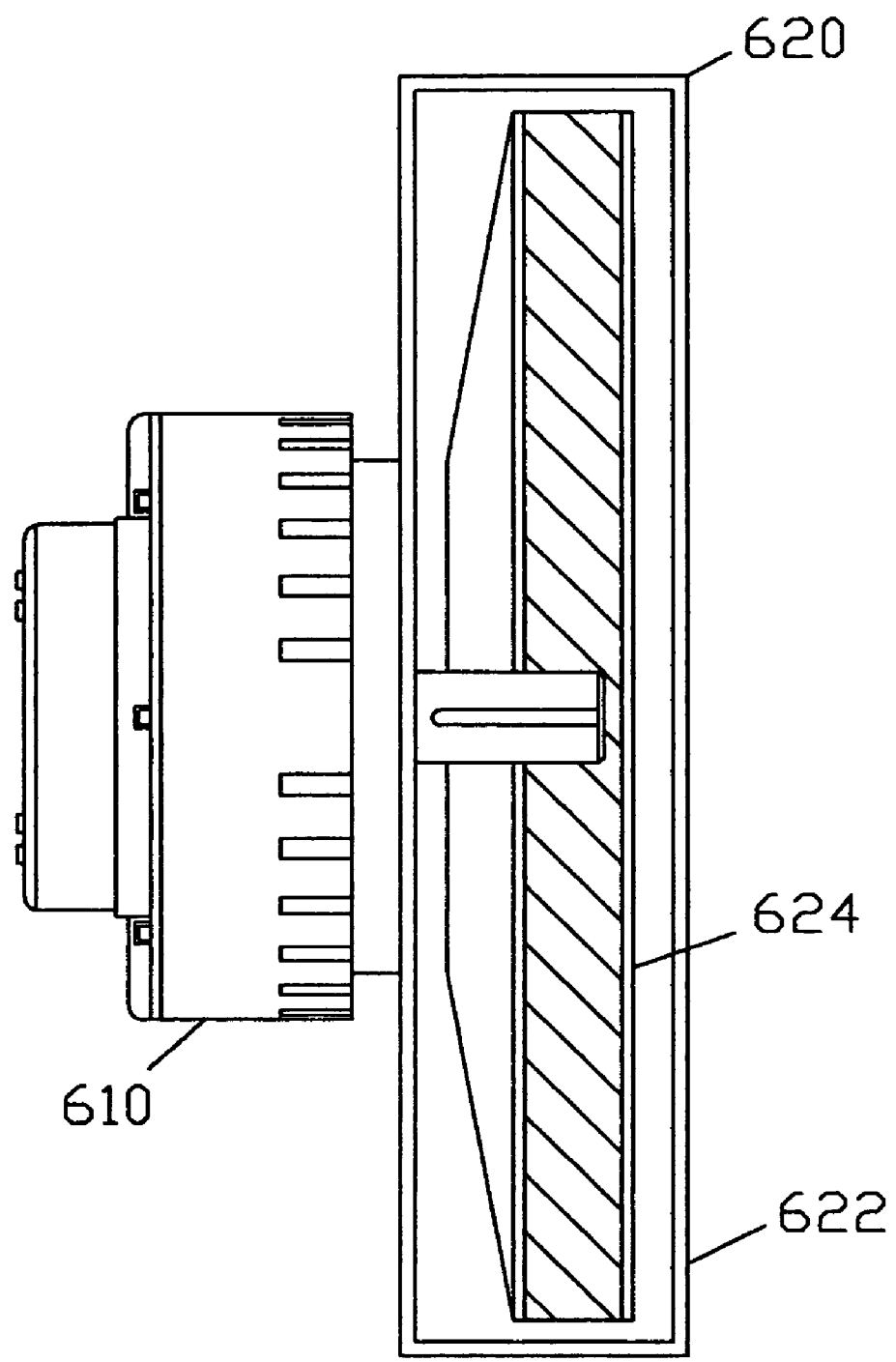
FIG. 6 is a schematic diagram of a motor-blower assembly useful in practicing the invention.

FIG. 6 is a schematic diagram of a motor-blower assembly 600 useful in practicing the invention. The motor 610 is a DC permanent magnet motor. The blower 620 comprises a housing 622, which is constructed from a suitable protective material, such as 10 gauge sheet steel, having apertures for air to enter therein, and for air to be expelled therefrom. The apertures are not shown in FIG. 6, but are well known in the motor-blower arts. The blower comprises a fan 624. In one embodiment, the blower is a Twin City fan model 18W8, available from Twin City Fan & Blower, 5959 Trenton Lane North, Minneapolis, Minn. 55442-3238.

Figure 7:
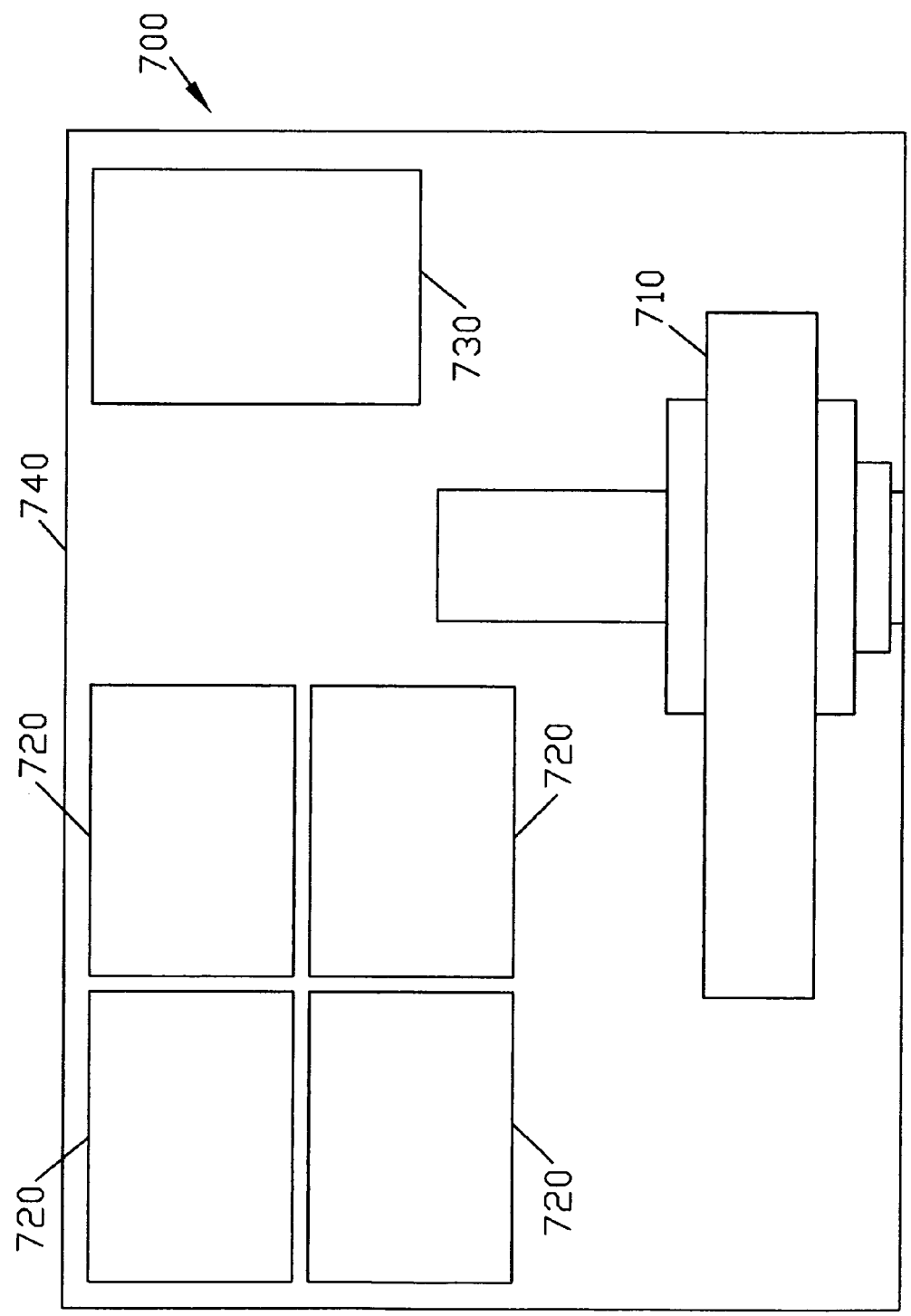
FIG. 7 is a plan diagram of a motor-blower, a battery and a conduit situated with a chamber, according to principles of the invention.

FIG. 7 is a plan diagram 700 of a motor-blower 710, a battery bank comprising batteries 720 and a conduit 730 situated with a chamber 740. The chamber 740 may be above ground or below ground. The chamber 740 is provided to protect its contents from the elements and from being vandalized or stolen. FIG. 7 does not show the various connections of the components.

Figure 8:
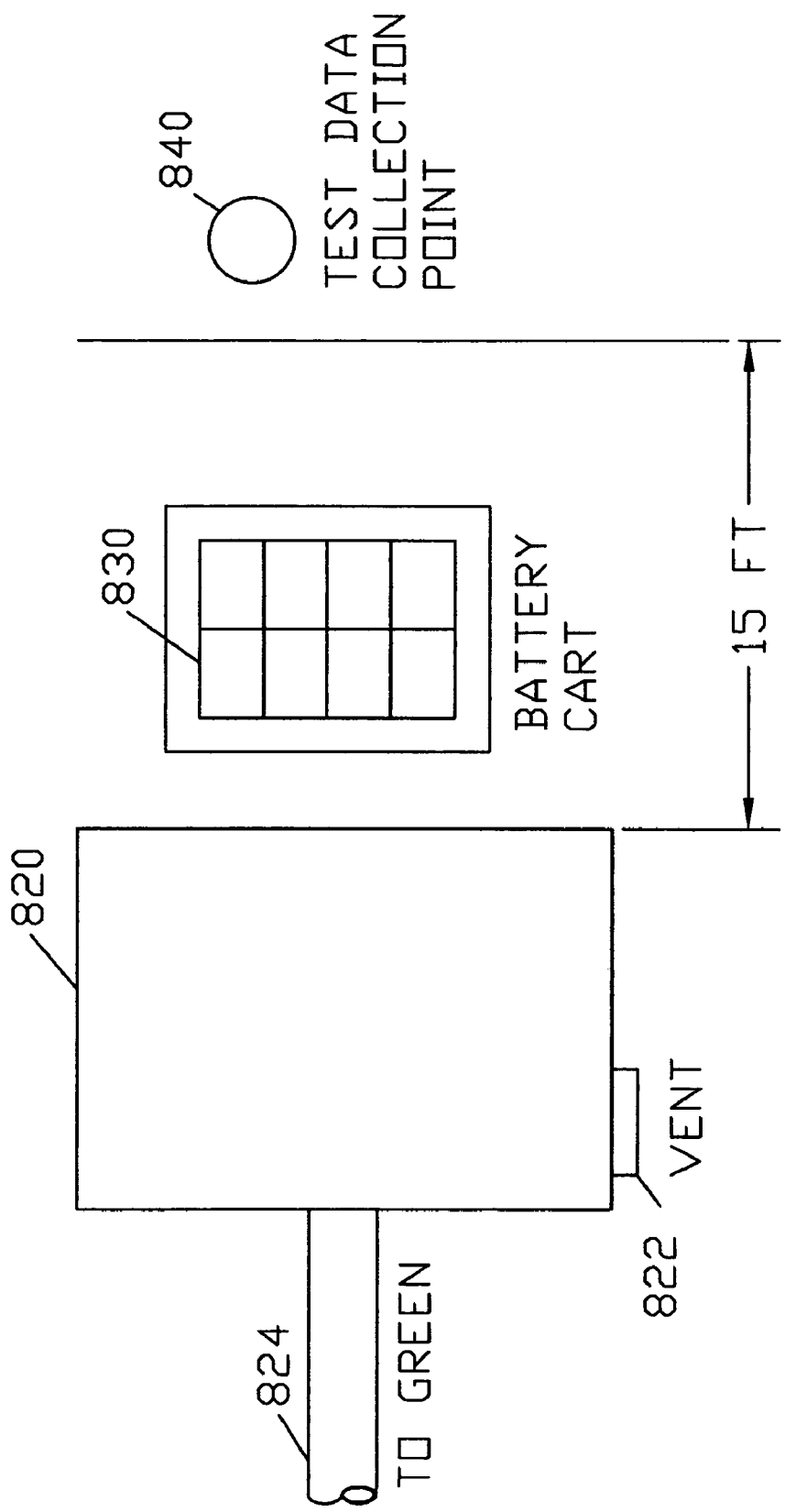
FIG. 8 is a plan diagram that shows an arrangement of components employed in testing the noise level generated during the operation of a system built according to the principles of the invention.

FIG. 8 is a plan diagram 800 that shows an arrangement of components employed in testing the noise level generated during the operation of a system built according to the principles of the invention. The components shown include a location for a housing 820 used to contain the motor-blower (not shown, but see FIG. 7), a location of a storage battery array 830, and the location of a data collection point 840 situated at a distance of approximately 15 feet from a side of the location of the housing 820. The housing comprises a vent 822 and a duct 824 such as would be used in a subsurface aeration conduit providing aeration services to a golf green. Noise levels were recorded for above ground configurations, with and without a silencer. Noise levels as low as 66 db were observed. It is expected that even lower noise levels can be achieved using the principles of the invention, for example by adding foam insulation to the housing 820.

Golf Course Environmental Management System

Another feature of the invention relates to systems and methods for managing a plurality of areas of interest within a golf course. The systems and methods of the invention use one or more sensors to provide information about the state of various environmental variables, such as an ambient air temperature, a soil temperature, and a soil moisture content. The systems and methods disclosed use the information to determine whether there is a need to adjust one or more of the environmental conditions, and if so, how best to effect the necessary adjustment or adjustments.

Figure 9:
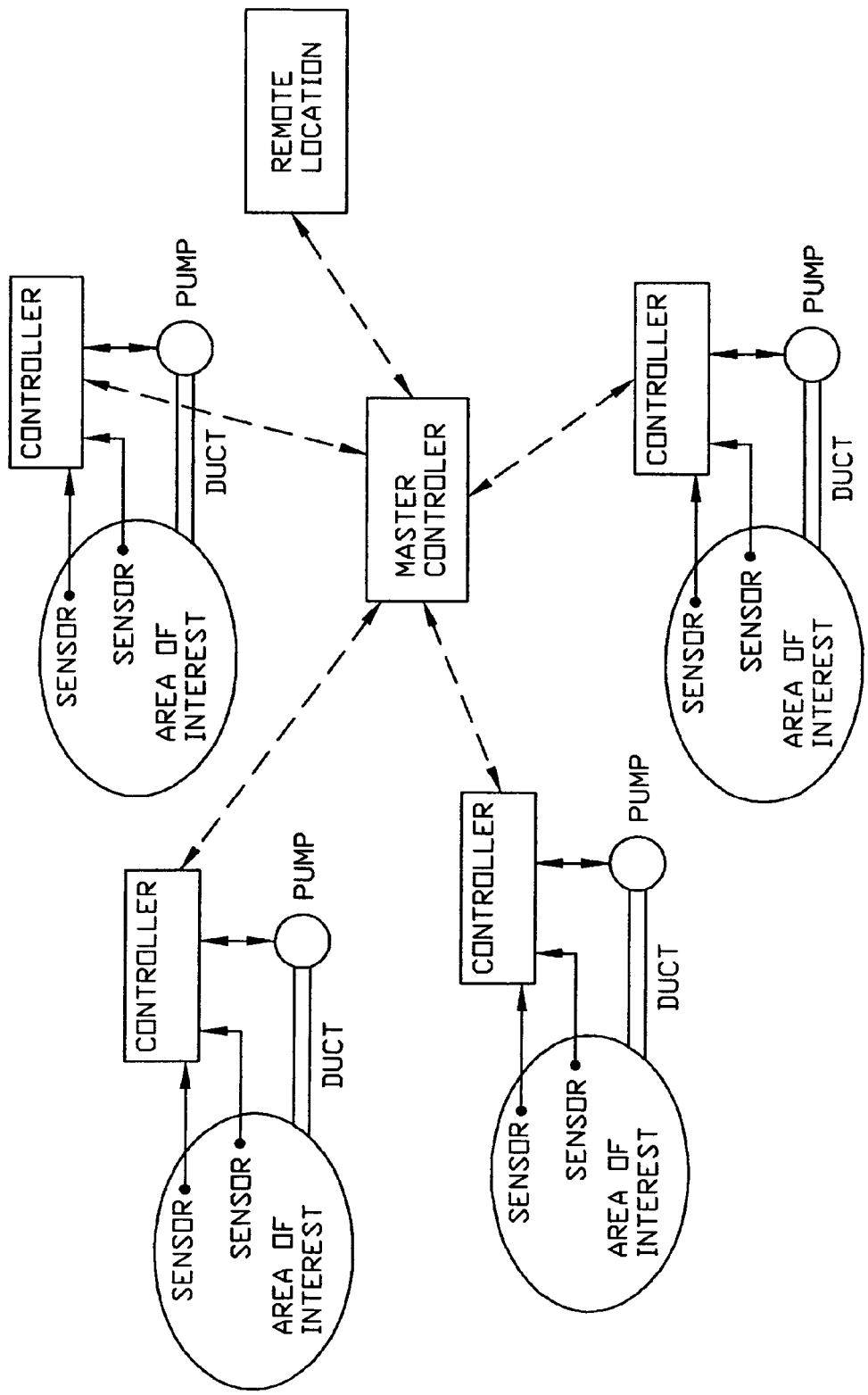
FIG. 9 is a drawing showing a plurality of electromechanical subsystems, each subsystem dedicated to a specific area of a golf course, and communicating with a programmable master control module, according to principles of the invention.

FIG. 9 is a drawing showing a plurality of electromechanical subsystems, each subsystem dedicated to a specific area of a golf course, and communicating with a programmable master control module. In FIG. 9, each electromechanical system comprises a subsurface aeration conduit and an air pump in fluid communication with the subsurface aeration conduit for providing to the specific area of the golf course at least one of air under pressure and a partial vacuum. The air pump is configured to provide at least one of air under pressure and a partial vacuum, as has been described hereinabove in several embodiments. A motor is mechanically connected to the air pump. A local control module is provided that is operatively coupled to the motor. The local control module is responsive to a directive and to a datum. The electromechanical system also comprises at least one sensor that measures an environmental parameter. The at least one sensor is in data communication with the local control module. The programmable master control module receives from at least two of the plurality of local control modules information representing a status of the respective specific area to which the local control module is dedicated, and in response to the information and to a command, the programmable master control module issues a directive to the local control module to operate the electromechanical subsystem.

In describing the system of the invention, certain words will be intended to convey particular meanings, which are not unlike their usage in common English, in order that the claim terminology will be more explicit than it might otherwise have been. The term "directive" as used herein is intended to mean an instruction from the programmable master control module to a local control module. The term "command" as used herein is intended to mean a computer instruction of a program operating on a computer or an instruction of a control logic sequence of a logic controller, or a user command for the programmable master control module. A user who issues directions of any kind to a local control module directly can be understood to have issued a directive even if the word "command" is used to express the user's action. The term "fault condition" as used herein is intended to mean that some electromechanical component or a local control module is not in proper operating order, and should be attended to (e.g., fixed, replaced). The term "alarm condition" as used herein is intended to mean that some operating condition (such as a temperature or a moisture content) is out of tolerance and needs to be corrected by operating the system, but does not imply anything about the condition of the electromechanical components. The term "setpoint" as used herein in intended to mean a value set by default, by a computer program, or by an operator to define a desired value of a parameter or condition, or an extremum of a range of acceptable values. An alarm condition occurs when a setpoint is deviated from, or an extremum of a range is exceeded. The term "closed loop operation" is well known in the computer control arts, and generally is understood to mean that a system uses a value generated as an output of a process as an input variable. "Closed loop operation" is distinguished from "open loop operation," which is used to describe a system that sets a control parameter with an eye to obtaining a specific output, but does not monitor an output variable for using in correcting the operation of the system. In the present invention, "closed loop operation" is also used to connote that the system will start and stop automatically based on the value or values of one or more variables such as the actual temperature and moisture content of soil or turf, and the ambient air temperature, which are compared to criteria or setpoints by a computer program of logic controller.

It is believed that heretofore, there has been no system such as is described and claimed herein that has been used with regard to golf courses. The inventors are aware that some sports fields, including the soccer field of Manchester United (U.K.), the soccer field of Kilmarnock (U.K.), the baseball and softball fields at the University of Nebraska, and the football field of the Denver Broncos in Denver, Colo., have employed similar methods of operation to those described herein. However, as stated hereinabove, it is believed that the varied conditions found in golf courses, which are appreciably different from the conditions found in a single unvarying expanse such as a football, a baseball, a softball or a soccer field, makes the application of the systems and methods of the invention to golf courses novel. See the second paragraph of the Detailed Description for examples.

The local control modules of the electromechanical subsystems receive data from the various sensors provided for the respective areas of interest. The local control modules in one embodiment are PLCs. In one embodiment, at least one of the local control modules further comprises a communication link accessible by way of a hand-held battery-powered device. In one embodiment, the hand-held battery-powered device is a selected one of a cellular telephone, a personal digital assistant (PDA), and a pocket personal computer (pocket PC). The sensors can monitor environmental parameters such as ambient air temperature, soil temperature, soil moisture, soil salinity, air pressure within a conduit, and solar radiation level, as well as other parameters such as motion within an area of interest, an image of an area of interest, sounds present at an area of interest and other information that may be useful in operating the system of the invention. In various embodiments, the sensors provide data to the respective local control modules as raw data, as digital data, or as data in a specified format.

The system of the present invention in one embodiment uses a wireless networking technology for communication between the local control modules and the programmable master control module. Advantages of a wireless system over a hard-wired system can include greater ease of installation, lowered cost of installation, greater speed of installation, and reduced chance of damage by lightning strikes as a result of the absence of a large "antenna" or "target" for lightning represented by miles of copper wiring. In a retrofit situation, a wireless installation can represent a smaller disruption to the operation of the golf course as compared to installing a hard-wired system. The communications can also be implemented using a hard-wired communication link, a fiber-optic communication link, or any other conventional communication link that can handle the transmission of data and instructions. In some embodiments, the system has the capability to communicate by way of a communication network, such as the Internet. In one embodiment, the communication network comprises a selected one of a telephone communication link, a wireless communication link, an optical communication link, and a packet-switched communication link. In one configuration, the system comprises eighteen (18) electromechanical subsystems, each one dedicated to a green of a golf course. However, the system can also be used with other portions of a golf course, such as at least a plurality of one or more golf greens, one or more fairways, one or more tee boxes, one or more walkways, one or more gallery viewing areas, one or more driving ranges, one or more putting greens, and one or more practice areas.

The programmable master control module is configured to receive information from the local control modules, and to send directives to the local control modules. The programmable master control module in one embodiment is a selected one of a programmable computer, a programmable logic controller (PLC), and a programmable industrial controller. The programmable master control module is programmed with software. In some embodiments, the software is a computer program comprised of one or more computer instructions recorded on a machine-readable medium. When the computer program is executing on the programmable master control module, one or more setpoints are defined for the operation of each electromechanical subsystem. The programmable master control module can compare a setpoint (or a range of acceptable values defined by a first extremum, such as a low soil temperature setpoint, and a second extremum, such as a high soil temperature setpoint, to an actual value of an environmental parameter observed by a sensor. A single value setpoint can include a tolerance about the setpoint (e.g. X degrees F., plus or minus 0.5 degrees F.). If the actual value of the environmental parameter is within an acceptable range, the programmable master control module can indicate that fact to a user of the system, for example, by displaying on a display the value in green. The programmable master control module can determine if an alarm condition exists, for example when one or more actual values of environmental parameters fall outside acceptable ranges. If the actual value is outside of an acceptable range, the programmable master control module can indicate that an alarm condition exists, and the fact that caused the alarm to a user of the system, for example, by displaying on a display an out-of-range value in red, by displaying the value with a unique font or a unique visual or audible attribute, by for example by flashing the value or emitting a sound. Optionally, the display also indicates the acceptable range for the out-of-range value. In some embodiments, the programmable master control module displays in a defined manner to a user the values of parameters that are being controlled to bring an out-of-range parameter within an acceptable range, for example displaying a value in yellow while the value is out-of-range and the system is taking action to adjust or correct the value. Similar displays are optionally provided at a local control modules when a user is operating the respective local control system directly, and/or at a remote location when a user is communicating with the system from such a remote location.

The programmable master control module can be programmed to institute a remedial action if an alarm condition exists. For example when one or more actual values of environmental parameters fall outside acceptable ranges, the programmable master control module determines the status of the particular area of interest. In some embodiments, a truth table is provided for each area of interest, including at least the one or more setpoints or setpoint-defined ranges for environmental parameters. The programmable master control module determines what corrective or remedial action should be instituted by performing one or more operations, such as comparing the status to a list of predefined remedial actions to be issued as directives, or by performing logical operations configured to yield one or more directives. The programmable master control module issues one or more directives to the respective local control module to operate the respective electromechanical subsystem to take the remedial action. The programmable master control module is configured in one embodiment to repeat from time to time the determination of the status of the particular area of interest, and while the determination indicates that additional remedial action is needed, directing the local control module to operate the subsurface aeration system to perform the necessary action. When the programmable master control module determines that the status of the area of interest conforms to the acceptable setpoint values, the programmable master control module directs the local control module to turn off the subsurface aeration system.

The programmable master control module is programmed to accept commands from an authorized user of the system, for example from a greens keeper, using an input device such as a keyboard. In some embodiments, the system is programmable to require that the user identify him- or herself to the system, for example with a token, such as a user name, a key, or a machine-readable card, and/or with a password or identification number, so as to prevent unauthorized operation of the system. In some embodiments, the system can transmit information for display to a user at a remote location and can receive information and commands from the user. For example, the greens keeper can review the status of one or more areas of a golf course from home, and as needed, can control the actions of the system from that remote location. The input and/or responses of the user can include commands, answers to queries and/or replies to information (by way of dialog boxes, radio buttons, and sliders as are well known in the computer interface arts), information in the form of files (such as new or improved programs), and updated setpoints. In some instances, the user is an individual or a computer associated with the vendor or supplier of the system.

The system of the invention can be programmed to operate at specific times, for example, during the evening or night when the areas of interest are not being used. Sensors can be used to detect the presence of players (including the data provided by any one or more of motion detection by motion sensors, visual images provided by electronic cameras, and sound detection by microphones) so that operation of certain features of the invention, such as the irrigation system, can be overridden or suppressed at appropriate times. In an alternative embodiment, infrared sensors are provided to detect infrared signals that may represent body heat or heat from a motor of a vehicle, such as a golf cart. In order to determine whether detected motion is caused by intruders, the system can activate one or more lights to permit visual signals to be recorded at night.

In some embodiments, the control of a specific area of interest can be accomplished using the local control module. In such instances, the local control module comprises a controller such as a PC, a PLC, or another microprocessorbased controller. The local control module operates software or a control logic sequence to receive data from one or more sensors, and to analyze the data to determine if any remedial action is necessary. If remedial action is needed, the local control module institutes the remedial action, and terminates the remedial action when a suitable outcome is obtained. The local control module in such an instance communicates with the programmable master control module to provide status information, so that a user of the system can be fully apprised of what transpires.

In some instances, a user of the system interacts with a local control module of a specific area of interest in a local mode. For example, when on site, a greens keeper can operate a local control module to perform a necessary operation of the electromechanical subsystem dedicated to the area of interest. The greens keeper might want to make specific adjustments, perform maintenance, or otherwise personally oversee an operation of the system at that location. Conveniently, a user can communicate with and control a local control module using a local display and a touch pad, a touch screen, a keyboard, or another convenient interface. Keyboards proving access by way of infrared interfaces, such as an IrDA interface, are also known. The user can communicate with at least one of the local control modules that further comprises a communication link accessible by way of a hand held battery-powered device. In one embodiment, the hand-held battery-powered device is a selected one of a cellular telephone, a personal digital assistant (PDA), and a pocket personal computer (pocket PC), which the user uses to gain access the local control module and to operate it, and thereby the specific electromechanical subsystem.

In some embodiments, the programmable master control module also provides a data logging capability and a data trending capability. The data logging and trending capabilities can be provided using any commercial database management software, proprietary database management software, and/or spreadsheet software. Data logging and trending is well known in the information technology arts, and will not be discussed at length herein.

The system provides fault detection capability. In some embodiments, the programmable master control module (by way of a local control module) monitors that status of components of the system. For example, the local control module can determine if a motor is drawing excessive power, or if the voltage across a storage battery is out of tolerance. The fault condition can be exhibited or enunciated to a user at any of a local control module, the programmable master control module, and a remote location when a user communicates with the system from such a remote location.

Figure 10:
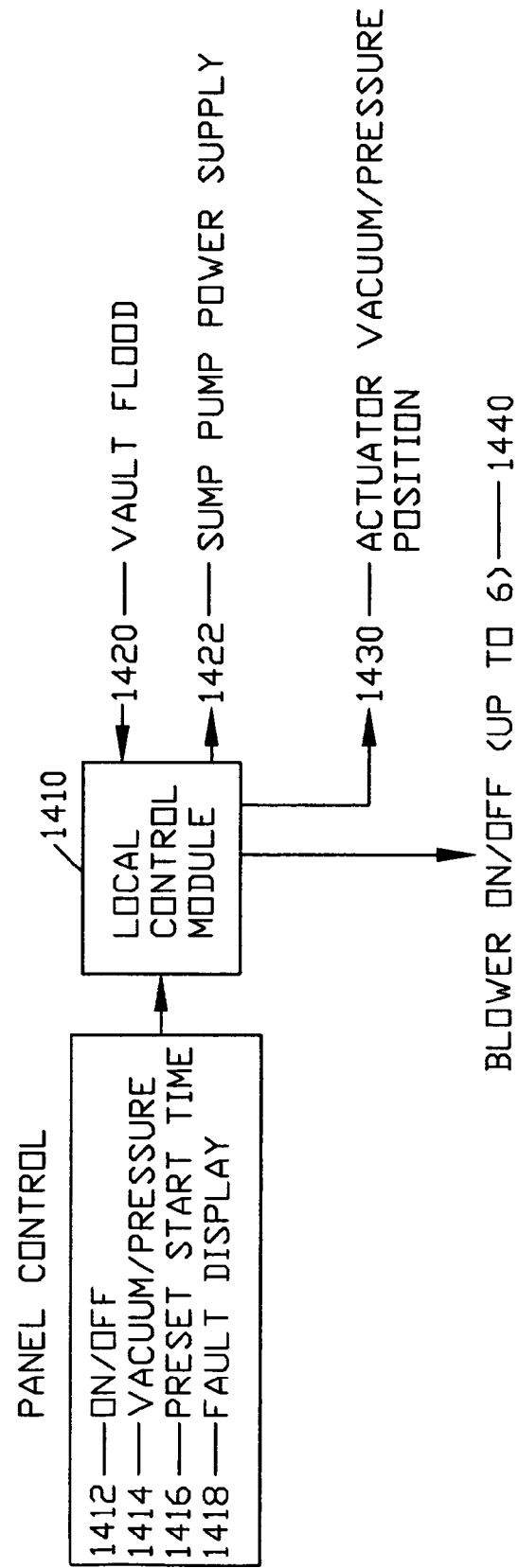
FIGS. 10–13 are drawings depicting exemplary embodiments of a local control module with different features, according to principles of the invention.

FIGS. 10–13 are drawings depicting exemplary embodiments of a local control module with different features. FIG. 10 shows an embodiment of a local control module 1410 that has a basic complement of features, including the ability to control the on or off state of a motor-blower 1412, the ability to control whether the motor-blower operates to provide air pressure or to provide a partial vacuum 1414, the ability to define a preset start time for operating the subsurface aeration subsystem controlled by the local control module 1416, and the ability to display fault conditions 1418. The local control module 1410 also has the ability to sense a flood condition 1420 in a vault (e.g., water entering the vault) in which the motor-blower and other components are secured, and can provide power 1422 to operate a sump pump and/or its associated power supply so as to prevent or counteract the flooding condition. The local control module can send a command 1430 to the reversing valve to determine a partial vacuum or air pressure configuration (e.g., actuator vacuum/pressure position). The local control module can send a command 1440 to activate or to deactivate the motor-blower, and in some embodiments, can activate/deactivate as many as six motor blower devices. A vault may be located below ground or above ground. With an above ground vault, the controls are located in an enclosure within the vault. For a below ground vault, the controls are located in an enclosure mounted above ground and communication wires connect it to the devices located within the vault.

Figure 11:
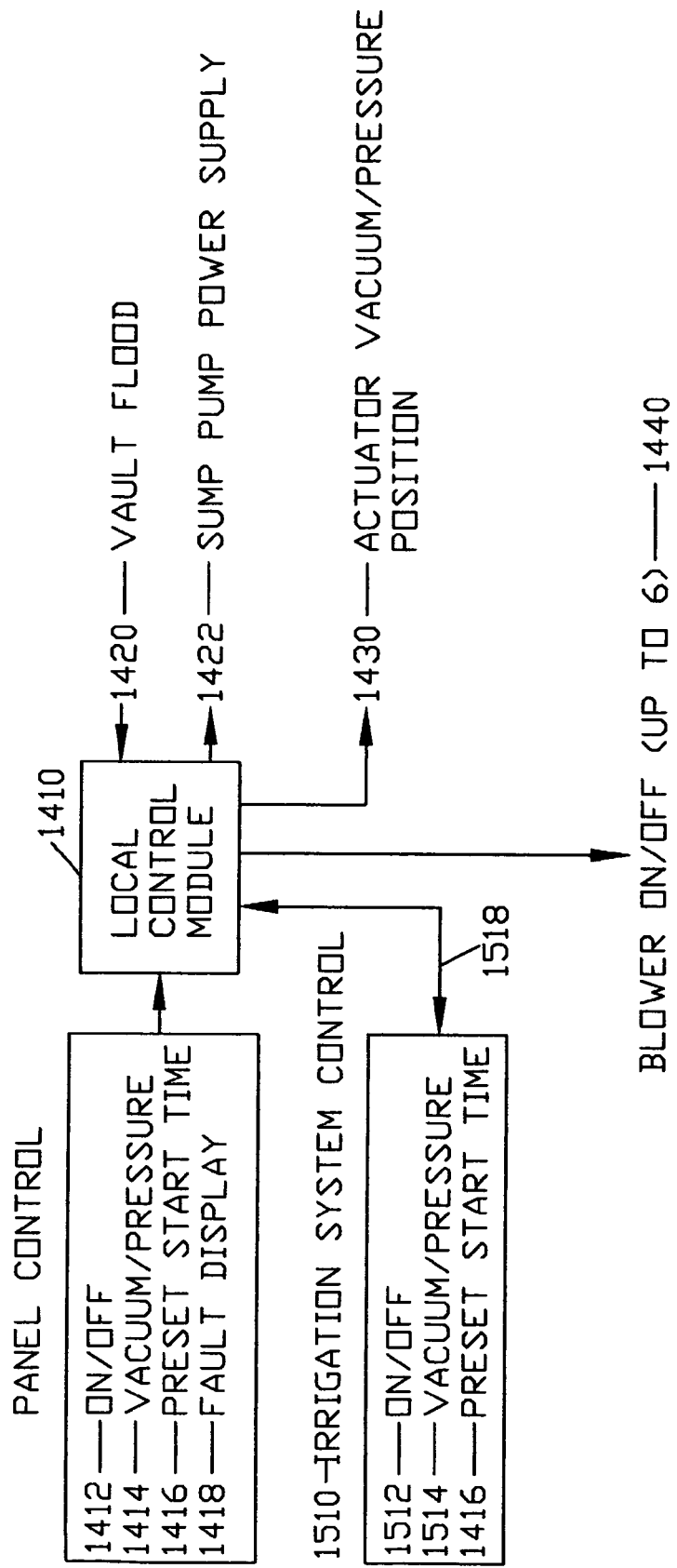

FIG. 11 shows another embodiment of a local control module 1410 that has the basic complement of features shown in FIG. 10 and in addition, the optional feature of controlling an irrigation system 1510. In some embodiments, the irrigation system can operate according to commands generated by a controller associated with the irrigation system 1510 itself, and, using bi-directional communication channel 1518, can communicate information such as an on or off state 1512, whether it is operating when the aeration system is configured in one of partial vacuum operation or air pressure operation, and commanded to begin operation at an optional preset start time 1516. In other embodiments, the irrigation system 1510 can be commanded, using bi-directional communication channel 1518, to turn on and off 1512, commanded 1514 to operate when the aeration system is configured in one of partial vacuum operation or air pressure operation, and commanded 1516 to begin operation at an optional preset start time. In some embodiments, the system can include logic to operate the irrigation system 1510 to deliberately increase a moisture content of the soil when adding water is appropriate.

Figure 12:
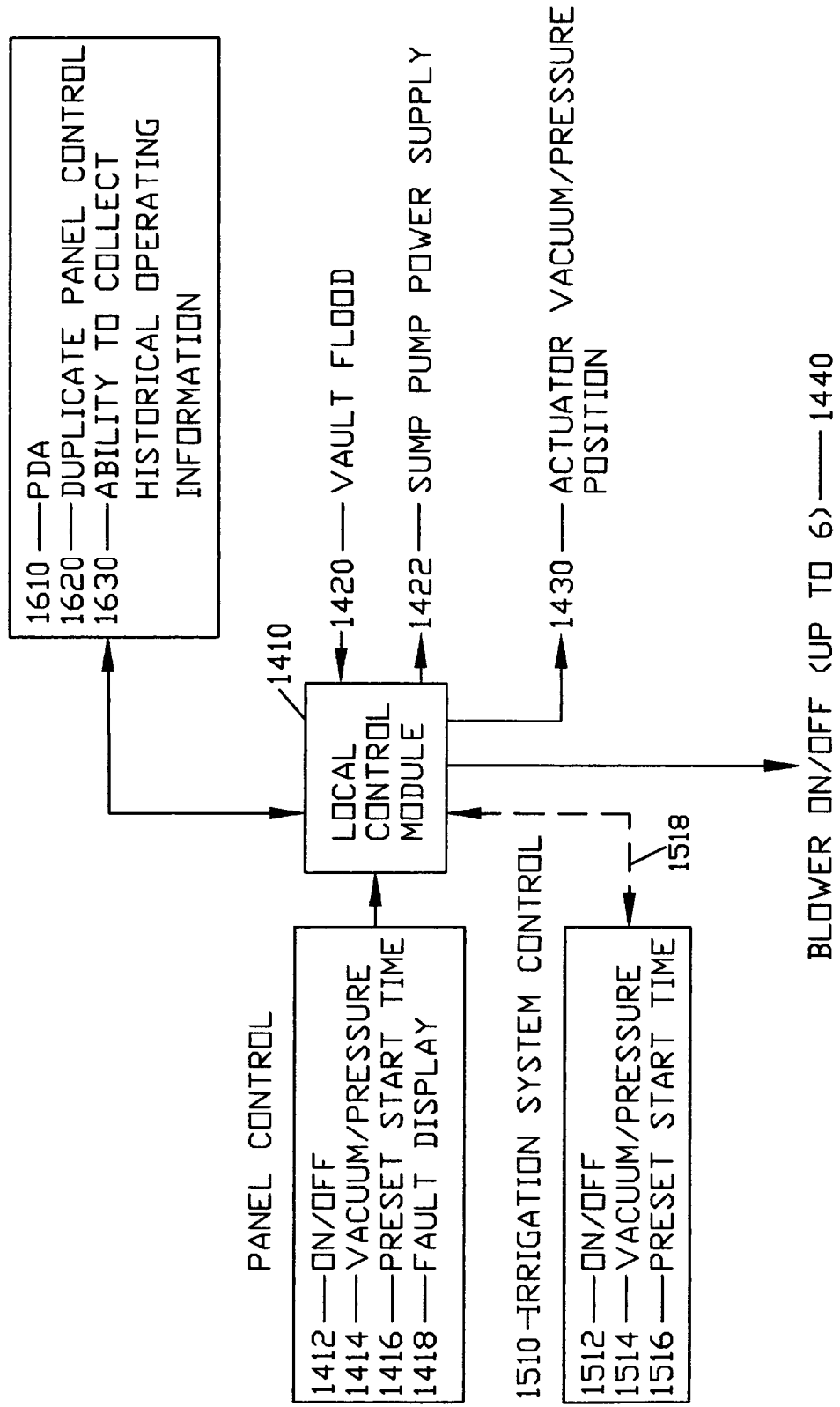

FIG. 12 shows another embodiment of a local control module 1410 that has the basic complement of features shown in FIGS. 10 and 11 and in addition, the feature of using a PDA 1610 to duplicate 1620 all of the control features of the local control module 1410. The PDA 1610 also provides the ability to collect historical operating information 1630, for example for statistical data analysis and for trending analysis.

Figure 13:
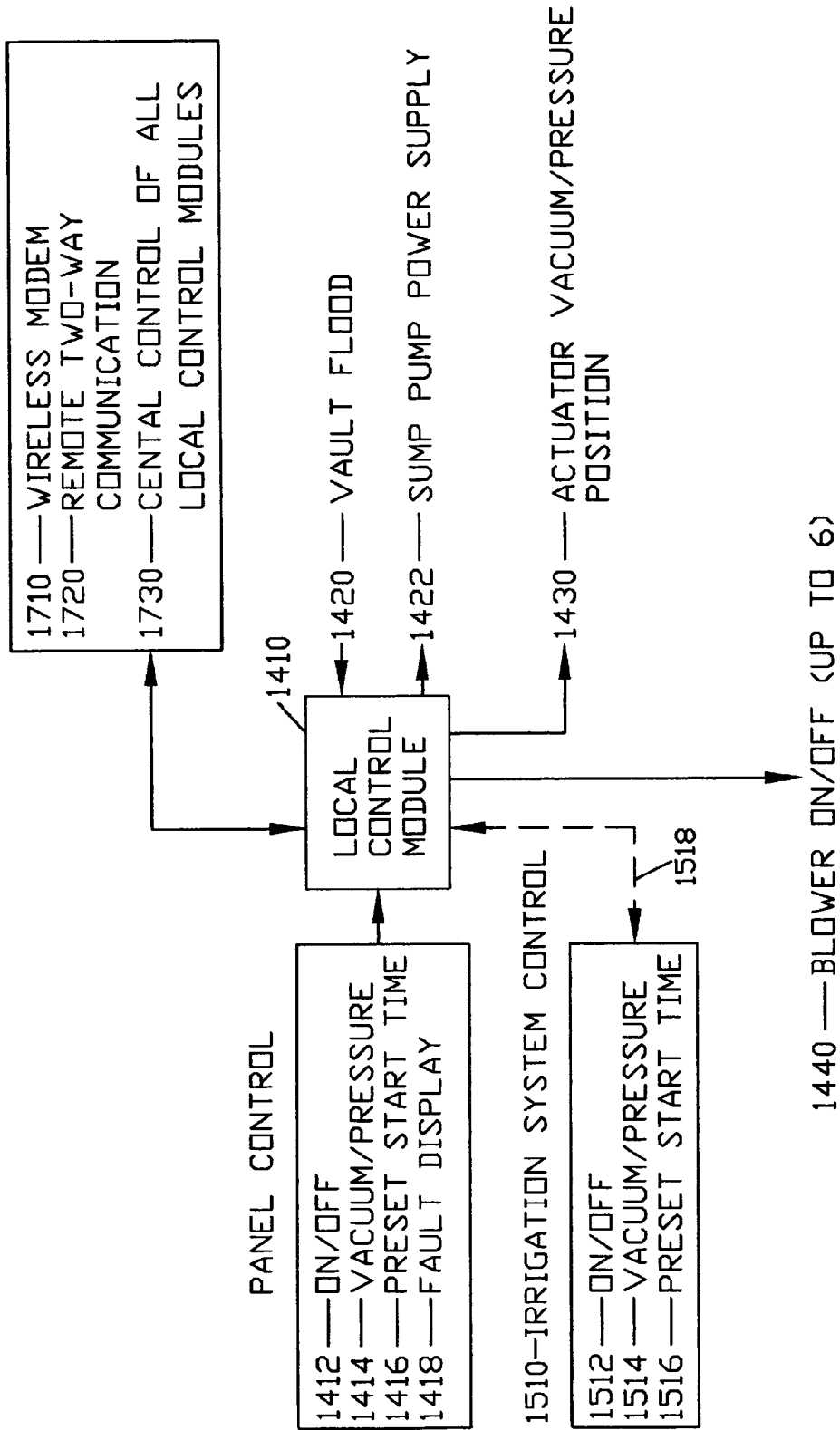

FIG. 13 shows a local control module 1410 that has the basic complement of features shown in FIGS. 10 and 11 and in addition, the feature of using a wireless modem 1710 to provide remote two way communication 1720 with the local control module 1410. The wireless modem 1710 provides the ability to control all of the local control modules from a central location 1730, for example using a personal computer situated in a clubhouse of a golf course.

Figure 14:
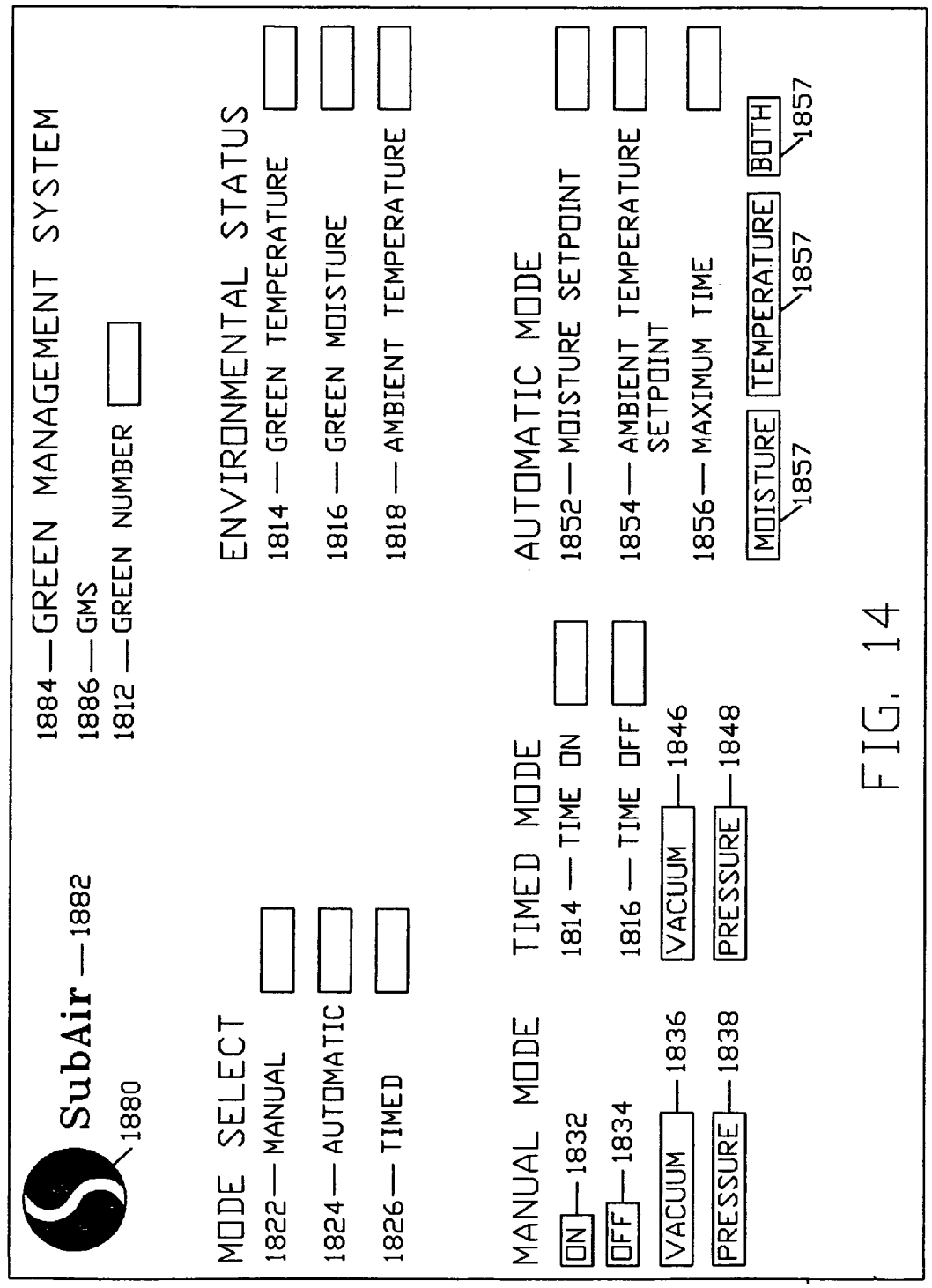
FIG. 14 is a drawing showing an exemplary embodiment of a user display, according to principles of the invention.

FIG. 14 is a drawing showing an exemplary embodiment of a user display 1810. In one embodiment, the user display is provided on any or all of a computer monitor, a PDA display screen, and a cellular telephone display screen. In some embodiments, the display screen is a touch screen. In the embodiment of FIG. 14, the display areas presented to a user include the following: an identifier "GREEN NUMBER" and a display box 1812 in which a number is displayed; an identifier "ENVIRONMENTAL STATUS" with three data identifiers, namely "green temperature," "green moisture," and "ambient temperature," followed respectively by regions 1814, 1816, 1818 in each of which a number is displayed, for example temperature in either degrees Fahrenheit or degrees Celsius, and moisture content as a percentage; a "SELECT MODE" identifier, with three possible modes, identified as "manual," "automatic," and "timed," followed respectively by regions 1822, 1824, 1826 that can be "buttons" such as are commonly presented to a user of a computer in a graphical user interface ("GUI") such as Microsoft Windows™, or they can be regions that are activated by a key press or mouse click, so that a user is informed which mode is selected for example by illumination, by color change, by highlighting such as flashing, or by any other convenient visual indication; and at the bottom of the display, three regions comprising "buttons" or indicators, one each for "MANUAL MODE," "TIMED MODE," and "AUTOMATIC MODE." In the event that "manual mode" is selected, the user can turn the motor-blower on or off, by activating a respective one of indicators 1832, 1834, and can select provision of partial vacuum or air pressure during operation by activating a respective one of indicators 1836, 1838. The indicators 1832, 1834, 1836 and 1838 can be regions similar to the regions 1822, 1824 and 1826. In the event that the "timed mode" is selected, numerical indications of time (e.g., in a format such as hours:minutes with or without an AM or PM indication) appear in regions 1842 and 1844, which respectively indicate a time for the controlled motor-blower to start, and a time for the controlled motor-blower to stop operation, as well as indicators 1846 and 1848, which as similar to indictors 1836 and 1838, and which respectively indicate operation with provision of partial vacuum or air pressure. In the event that "automatic mode" is selected, the display indicates a moisture setpoint in region 1852, an ambient temperature setpoint in region 1854, and an optional maximum time of operation in region 1856. The automatic mode when active deals with moisture and temperature excursions from desired values, and can indicate, by activating indicators 1857, 1858, and 1859, whether the automatic system is operating to deal with an excursion in moisture content, an excursion in temperature, or excursions in both parameters, by activating a respective one of indicators 1857, 1858 and 1859. In some embodiment, the display 1810 can further include a logo 1880, a vendor name 1882, and an indication that the system is a "GREENS MANAGEMENT SYSTEM" 1884 (or GMS 1886).

Figure 15:
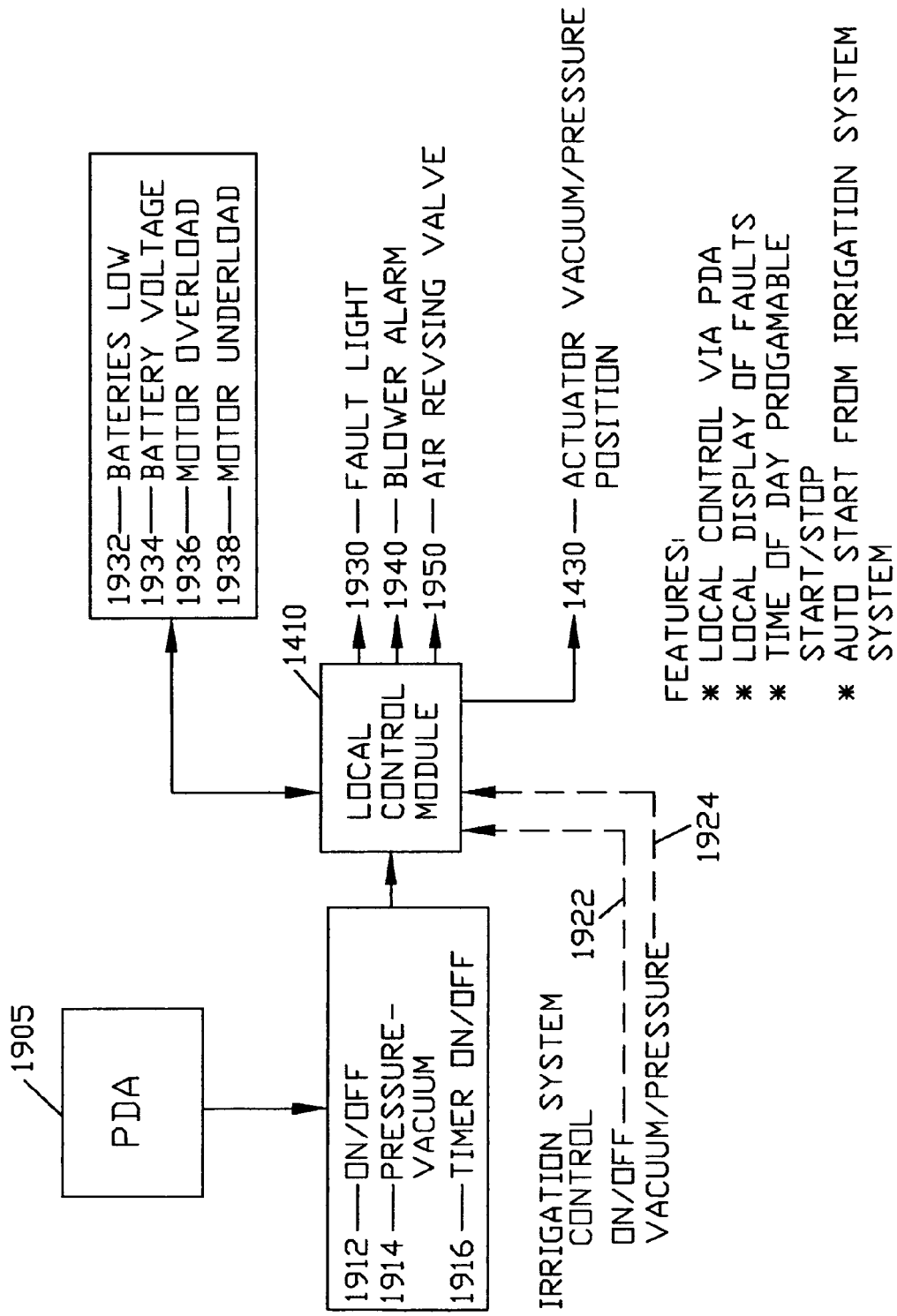
FIG. 15 is a diagram of an exemplary local control module, showing various control signal paths, according to principles of the invention.

FIG. 15 is a diagram of an exemplary local control module 1410, showing various control signal paths. The local control module 1410 receives signals from a PDA 1905 module indicating the on/off 1912 condition of a motor-blower, the air pressure/partial vacuum configuration 1914 of a reversing valve, and a timer on/off time 1916. The local control module 1410 receives information about the condition of an optional irrigation system, including whether the irrigation system is on or off 1922, and whether the irrigation system is configured to operate when the reversing valve is configured to provide air pressure or partial vacuum 1924. The local control module 1410 provides signals indicating the presence of a fault 1930, for example by illuminating a fault light, which can indicate any of the conditions of low batteries 1932, a problem in the battery vault 1934 such as flooding, a motor overload 1936, and a motor underload 1938. A signal 1940 is provided to indicate that the motor-blower is starting (or is operating), and a signal 1950 is provided to indicate the configuration of the reversing valve (e.g., providing air pressure or partial vacuum). The local control module 1410 can in some embodiments receive signals from other hand held controllers, such as cellular telephones. The local control module 1410 can communicate as well with the programmable master control module.

Figure 16:
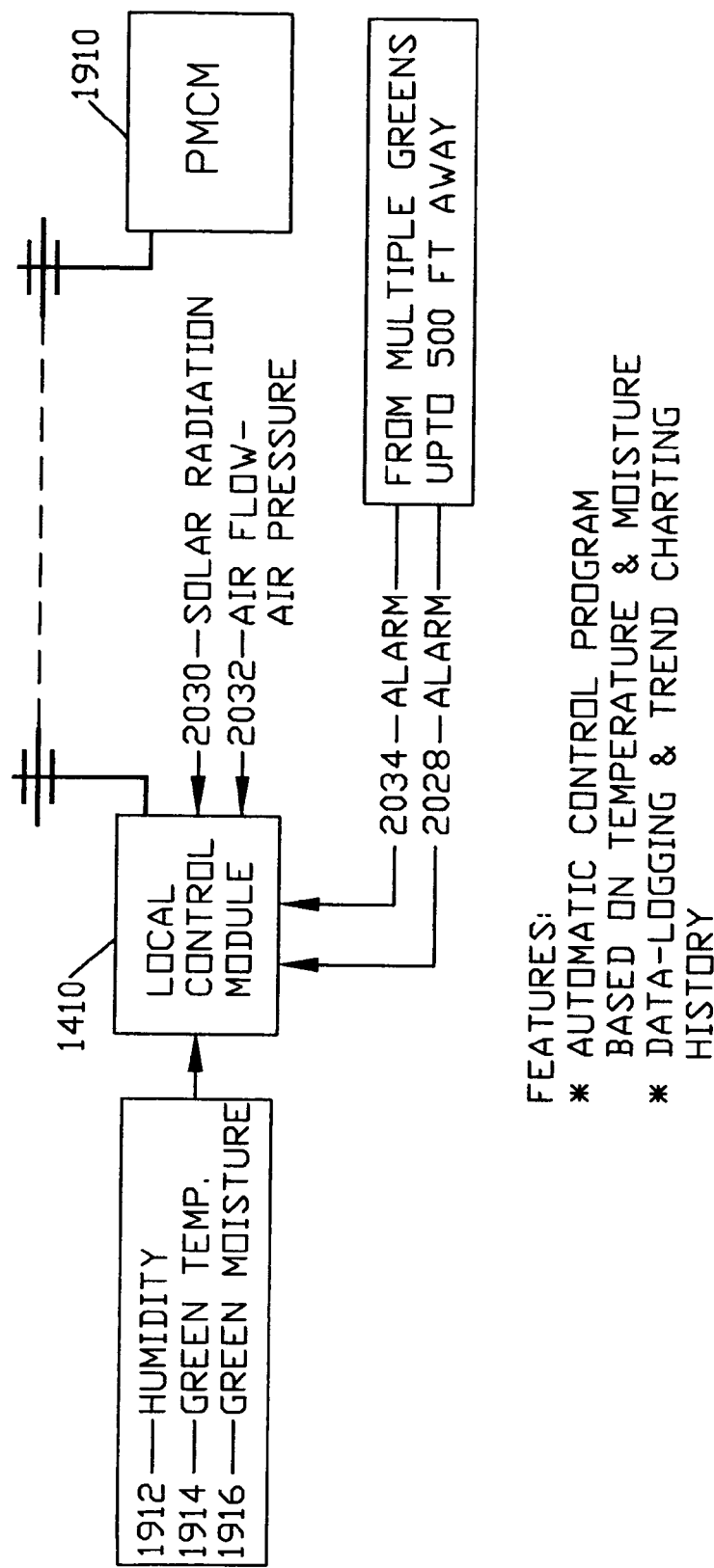
FIG. 16 is a diagram of an illustrative communication configuration including a local control module and a programmable master control module, and showing various environmental sensor signal paths, according to principles of the invention.

FIG. 16 is a diagram of an illustrative communication configuration including a local control module (LCM) 1410 and a programmable master control module (PMCM) 1910, and showing various environmental sensor signal paths. In FIG. 16, the local control module 1410 receives a variety of environmental signals from sensors, including humidity 2022, green (or soil) temperature 2024, green (or soil) moisture 2026, ambient temperature 2028, solar radiation level 2030, air flow/air pressure in a conduit 2032, and other signals 2034. The data collected by the local control module 1410 is communicated in one embodiment by wireless communication link 2040 to a programmable master control module 1910.

Figure 17:
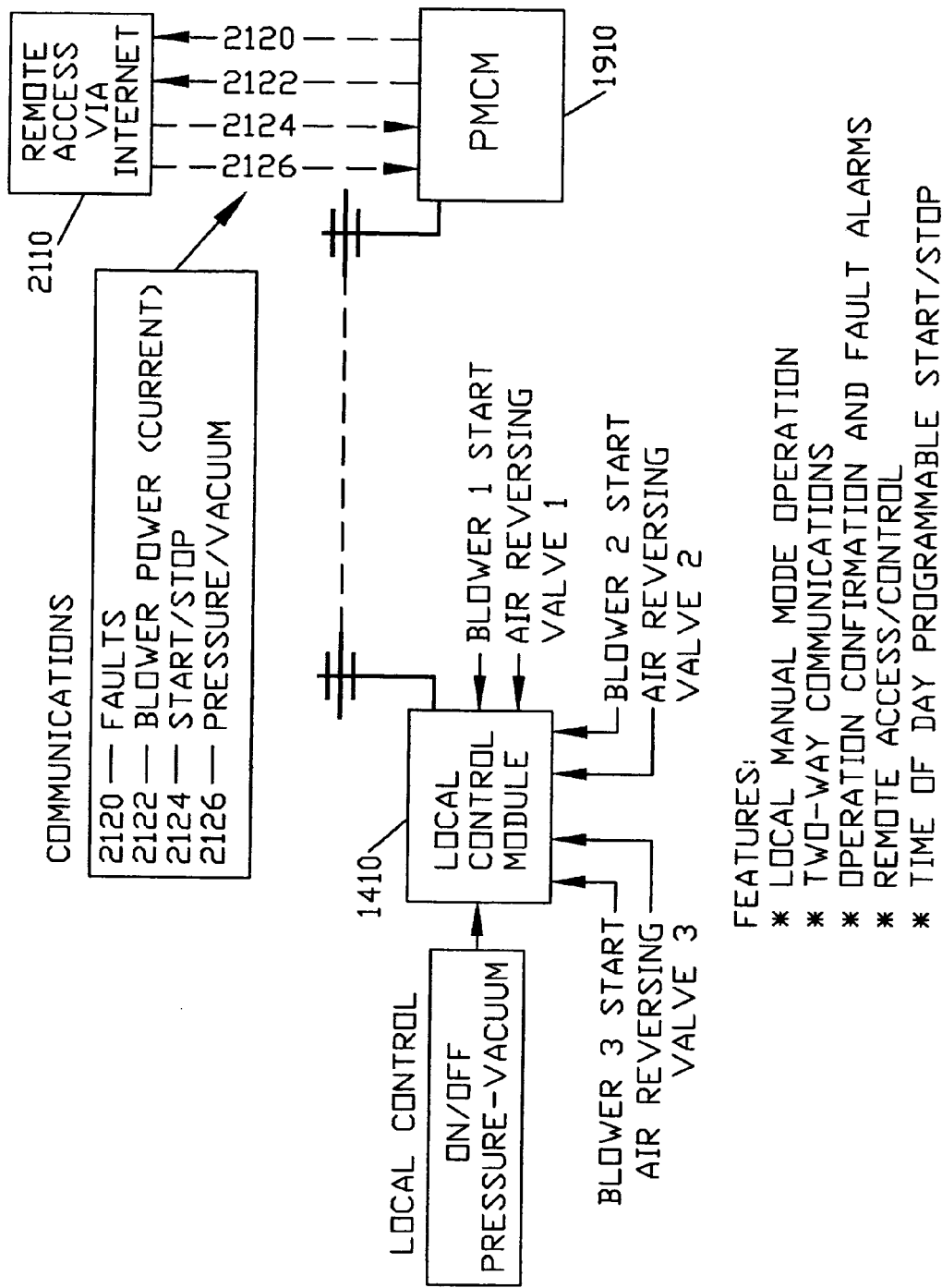
FIG. 17 is a diagram showing an exemplary configuration of communication paths including remote access via the Internet, according to principles of the invention.

FIG. 17 is a diagram showing an exemplary configuration of communication paths including remote access via the Internet. In the embodiment shown in FIG. 17, a local control module 1410 communicates by radio modem with a programmable master control module 1910, which in turn is (optionally) in communication with a remote access site 2110 connected by way of the Internet. The local control module 1410 receives signals 1412, 1414 from a sensor that monitors the current provided to the motor-blower. The local control module 1410 in the embodiment of FIG. 17 controls three subsurface aeration subsystems, and can issue commands to turn motors on and off, and to control a configuration of a reversing valve. The local control module 1410 sends information to a programmable master control module 1910, and receives directives from the programmable master control module 1910. In turn, the programmable master control module 1910 communicates fault conditions 2120, status information such as motor-blower power and/or current 2122 and the like to the remote access site 2110 which is manned by a user. The information sent to the remote access site 2110, which in some embodiments is a personal computer, can be any information that would be displayed to a user on the display screen 1810, as well as other information useful for statistical analysis and trending analysis. The user at the remote access site 2110 can issue commands including, for example, start and stop commands 2124 for a motor-blower, and configuration commands 2126 to configure a reversing valve to provide a selected one of air under pressure or a partial vacuum. The programmable master control module 1910 in turn issues directives to the local control module 1410, by which directives the local control module 1410 is instructed to carry out the commands of the user operating the remote access site 2110.

Figure 18:
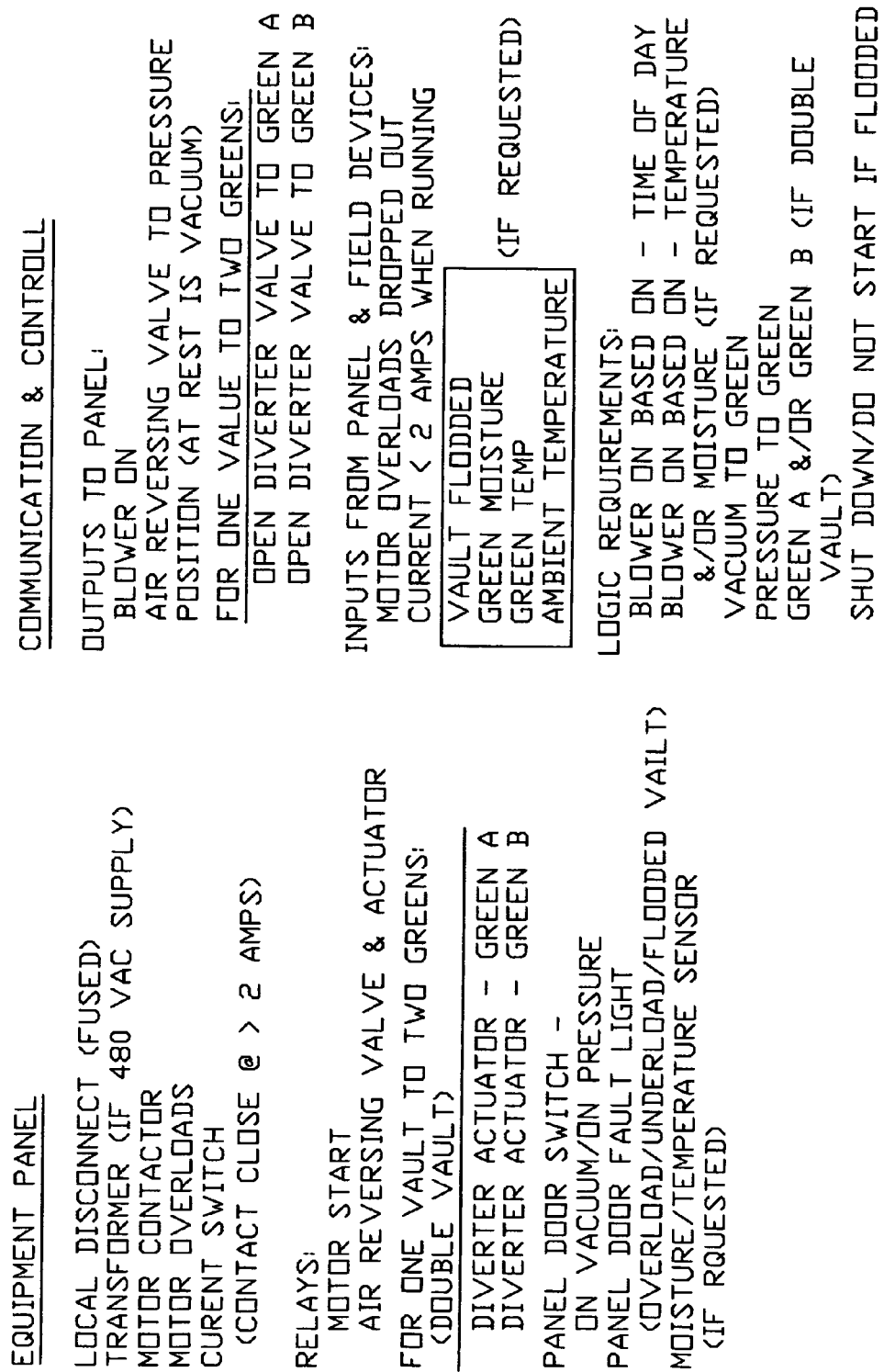
FIG. 18 is an enumeration of some of the components, communication and control channels, and logic structure of one or more embodiments of the golf course environmental management system, according to principles of the invention.

FIG. 18 is an enumeration of some of the components, communication and control channels, and logic structure of one or more embodiments of the golf course environmental management system. The components enumerated include an equipment panel and various field devices. The equipment panel is one example of the local control module described hereinabove. The field devices include a high pressure blower, an air reversing valve and actuator, a sump pump, a float switch, a moisture/soil temperature sensor, and an ambient air temperature sensor, as well as associated operational equipment such as a local electrical disconnect, a transformer, a motor contactor, a current switch, a motor overload indicator, relays for various purposes, such as starting the motor and operating the actuator for the air reversing valve, a panel door switch and a fault light on the panel door. Some of the field devices are optional in some embodiments. FIG. 18 describes in overview some of the communication and control lines that are provided in some embodiments, and the signals that pass along the communication and control lines. In one embodiment, the description of the communication and control refers to control signals and status signals that are communicated to and from the programmable master control module described hereinabove. The logic requirements, such as blower on based on time of day, or blower on based on temperature and or moisture, can be implemented by local control module itself, or by the programmable master control module (or by a user of the system) and communicated as a directive to the local control module.

The invention furthermore makes possible a method of decreasing the moisture content of soil in a specific area of interest selected from a plurality of areas of interest within a golf course. The method comprises the steps of providing a subsurface aeration system at each of the plurality of areas of interest, and operating the subsurface aeration system to provide at least a partial vacuum when the soil moisture is greater than a first setpoint value, thereby drawing ambient air through the specific area of interest, causing the partial vacuum to assist in the gravity draining of water from the soil. Each subsurface aeration system comprises a subsurface aeration conduit for providing to the specific area of the golf course at least one of air under pressure and a partial vacuum; an air pump in fluid communication with the subsurface aeration conduit, the air pump configured to provide at least one of air under pressure and a partial vacuum; a motor mechanically connected to the air pump; at least one sensor that measures a soil moisture.

In one embodiment, the at least one sensor that measures a soil moisture and the at least one sensor that measures a soil temperature are a unitary structure.

In one embodiment, the method further comprises the steps of providing a control module responsive to a directive, and to the soil moisture, the control module coupled to the subsurface aeration system to control the operation thereof determining whether the soil moisture is greater than a first setpoint value, causing the subsurface aeration system to operate to decrease the soil moisture content.

In one embodiment, the method further comprises repeating from time to time the determining step, and while the determination is positive, directing the local control module to operate the subsurface aeration system to decrease the soil moisture content of soil.

In one embodiment, the method further comprises the steps of providing a programmable master control module in communication with the control module; receiving at the programmable master control module information sent from the control module, the information representing the soil moisture content, comparing it to the first setpoint; and, if the determination is positive, issuing from the programmable master control module the directive to the local control module to operate the electromechanical subsystem decrease the moisture content of the soil.

In one embodiment, the method further comprises repeating from time to time the determining step, and while the determination is positive, issuing from the programmable master control module the directive to the local control module to operate the electromechanical subsystem to decrease the moisture content of the soil.

As should be evident from the disclosure above, systems embodying principles of the invention provide an effective means for treating subsoil regions to maintain the soil temperatures at desired levels. At the same time, the systems can be utilized to promote drainage in these regions as well as providing for subsoil chemical treatment and aeration. The systems can be easily retrofitted to existing golf greens or other similar underground drainage systems or incorporated into new construction.

Although the present invention has been described with reference to use in association with a four way flow reversing valve, this valve can be replaced by a universal coupling that permits the separator to be selectively coupled to either the discharge or the suction port of the blower. This combined with the use of the above described mobile unit, provides for an economically feasible system for treating existing greens that are in compliance with USGA specifications. Stationary systems embodying the apparatus of the present invention are contained below ground in specially prepared vaults and also located above ground inside an enclosure and that the local controls associated with the system are automatically operated so that the system is controlled from a remote location without having to enter the vault or enclosure. The principles of the invention can also be applied to California-style drainage systems and to other presently unknown configurations of golf course drainage systems.

Machine-readable storage media that can be used in the invention include electronic, magnetic and/or optical storage media, such as 3.25 inch magnetic floppy disks and hard disks, a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and such machine-readable symbols as one and two dimensional bar codes.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope and spirit of the following claims.

What is claimed is:

1. A system for managing a plurality of areas of interest within a golf course, comprising:
   a plurality of electromechanical subsystems, each subsystem dedicated to a specific area of said golf course, each subsystem comprising:

a subsurface aeration conduit for providing to said specific area of said golf course at least one of air under pressure and a partial vacuum;

an air pump in fluid communication with said subsurface aeration conduit, said air pump configured to provide at least one of air under pressure and a partial vacuum;

a motor mechanically connected to said air pump;

a local control module responsive to a directive and to a datum, said local control module operatively coupled to said motor; and at least one sensor that measures an environmental parameter, said at least one sensor in data communication with said local control module; and a programmable master control module in communication with each of said plurality of local control modules;

whereby said programmable master control module receives from at least two of said plurality of local control modules information representing a status of the respective specific area to which said local control module is dedicated, and in response to said information and to a command, said programmable master control module issues a directive to each of said local control modules to operate said electromechanical subsystem.

2. The system for managing a plurality of areas of interest within a golf course of claim 1, wherein said subsurface aeration conduit is a device used to supply air under pressure to or withdraw air under vacuum from the subsurface of said area of interest on said golf course.

3. The system for managing a plurality of areas of interest within a golf course of claim 1, wherein said subsurface aeration conduit is a selected one of interconnecting perforated pipe, interconnecting porous pipe and channels formed by a placement of spacing devices.

4. The system for managing a plurality of areas of interest within a golf course of claim 3, wherein said spacing devices comprise trays.

5. The system for managing a plurality of areas of interest within a golf course of claim 1, wherein said motor is an electric motor.

6. The system for managing a plurality of areas of interest within a golf course of claim 1, wherein said programmable master control module is a selected one of a programmable computer, a programmable logic controller (PLC), and a programmable industrial controller.

7. The system for managing a plurality of areas of interest within a golf course of claim 1, wherein said programmable master control module is in communication with a selected one of said plurality of local control modules by way of a selected one of a hard-wired communication link, a wireless communication link, and a fiber-optic communication link.

8. The system for managing a plurality of areas of interest within a golf course of claim 1, wherein said programmable master control module further comprises a connection to a communication network.

9. The system for managing a plurality of areas of interest within a golf course of claim 8, wherein said communication network comprises a selected one of a telephone communication link, a wireless communication link, an optical communication link, and a packet-switched communication link.

10. The system for managing a plurality of areas of interest within a golf course of claim 9, wherein said system can communicate information over said selected communication link to a user at a remote location.

11. The system for managing a plurality of areas of interest within a golf course of claim 9, wherein said system can receive a command over said selected communication link from a user at a remote location.

12. The system for managing a plurality of areas of interest within a golf course of claim 1, wherein at least one of said local control modules further comprises a communication link accessible by way of a hand-held battery-powered device.

13. The system for managing a plurality of areas of interest within a golf course of claim 12, wherein said hand-held battery-powered device is a selected one of a cellular telephone, a personal digital assistant (PDA), and a pocket personal computer (pocket PC).

14. The system for managing a plurality of areas of interest within a golf course of claim 1, wherein at least one electromechanical subsystem further comprises a reversing mechanism in fluid communication with said air pump and with said subsurface aeration conduit, said reversing mechanism configured to cause air to flow in a first flow direction to provide air under pressure, and configured to cause air to flow in a second flow direction to provide a partial vacuum.

15. The system for managing a plurality of areas of interest within a golf course of claim 14, wherein said reversing mechanism is responsive to said local control module.

16. The system for managing a plurality of areas of interest within a golf course of claim 1, wherein at least one electromechanical subsystem further comprises an irrigation system configured to irrigate at least a portion of a selected one of said specific areas of said golf course.

17. The system for managing a plurality of areas of interest within a golf course of claim 16, wherein said local control module is operatively coupled to said irrigation system.

18. The system for managing a plurality of areas of interest within a golf course of claim 16, wherein said irrigation system further comprises at least one sprinkler.

19. The system for managing a plurality of areas of interest within a golf course of claim 16, wherein said irrigation system is configured to control a flow rate of water.

20. The system for managing a plurality of areas of interest within a golf course of claim 16, wherein said irrigation system is configured to add substances to irrigation water.

21. The system for managing a plurality of areas of interest within a golf course of claim 20, wherein said substances that said irrigation system is configured to add to irrigation water comprise at least one of a nutrient for a plant, an anti-fungal agent, and a chemical.

22. The system for managing a plurality of areas of interest within a golf course of claim 1, wherein said at least one sensor that measures an environmental parameter comprises a sensor that measures at least one of a temperature, a moisture content, an illumination, a chemical concentration, and a motion.

23. The system for managing a plurality of areas of interest within a golf course of claim 1, wherein said programmable master control module comprises a data recording and analysis module.

24. The system for managing a plurality of areas of interest within a golf course of claim 23, wherein said data recording and analysis module is configured to record a selected one of a parameter relating to aeration, a parameter relating to irrigation, an operating parameter of an air pump, a temperature, a moisture content, a parameter relating to an additive applied to irrigation water, and a time.

25. The system for managing a plurality of areas of interest within a golf course of claim 23, wherein said data recording and analysis module is configured to analyze one or more parameters relating to aeration, to irrigation, to operation of an air pump, to a temperature, to a moisture content, to an additive applied to irrigation water, and to a time.

26. The system for managing a plurality of areas of interest within a golf course of claim 23, wherein said data recording and analysis module is configured to compare a selected parameter to a setpoint.

27. The system for managing a plurality of areas of interest within a golf course of claim 23, wherein said data recording and analysis module is configured to determine a status of at least one of said electromechanical subsystems.

28. The system for managing a plurality of areas of interest within a golf course of claim 1, wherein said programmable master control module further comprises a master display.

29. The system for managing a plurality of areas of interest within a golf course of claim 28, wherein said master display exhibits a status of at least one of said electromechanical subsystems.

30. The system for managing a plurality of areas of interest within a golf course of claim 29, wherein said status is a selected one of a time when said electromechanical subsystem begins to operate, a duration of operation of said electromechanical subsystem, an operating parameter of said electromechanical subsystem, a environmental condition, a fault condition, an alarm condition, a setpoint, and a directive.

31. The system for managing a plurality of areas of interest within a golf course of claim 30, wherein said operating parameter of said electromechanical subsystem comprises a selected one of an electrical current, a pressure, a temperature, a vacuum, an air flow, and a water flow.

32. The system for managing a plurality of areas of interest within a golf course of claim 30, wherein said environmental condition comprises a selected one of a soil temperature, an ambient temperature, a moisture content, an amount of solar radiation received in a specified time period, a soil salinity, and a detection of motion.

33. The system for managing a plurality of areas of interest within a golf course of claim 32, wherein said ambient temperature is an ambient air temperature.

34. The system for managing a plurality of areas of interest within a golf course of claim 32, wherein said moisture content is a selected one of a soil moisture content and an air humidity.

35. The system for managing a plurality of areas of interest within a golf course of claim 1, wherein said programmable master control module further comprises an input device for receiving commands from a user of said system.

36. The system for managing a plurality of areas of interest within a golf course of claim 35, wherein said input device for receiving commands from a user of said system comprises a selected one of a keyboard, a key pad, a touch pad, a touch screen, a mouse, a joystick, a light pen, a pointing device, and a microphone.

37. The system for managing a plurality of areas of interest within a golf course of claim 35, wherein said command is a command received from a user.

38. The system for managing a plurality of areas of interest within a golf course of claim 1, wherein said command is a command received from a computer program operating on said programmable master control module.

39. The system for managing a plurality of areas of interest within a golf course of claim 1, wherein said temperature is a selected one of a soil temperature and an ambient temperature.

40. The system for managing a plurality of areas of interest within a golf course of claim 1, wherein at least one of said electromechanical subsystems further comprises a local display.

41. The system for managing a plurality of areas of interest within a golf course of claim 40, wherein said local display exhibits a status of said electromechanical subsystem.

42. The system for managing a plurality of areas of interest within a golf course of claim 41, wherein said status is a selected one of a time when said electromechanical subsystem begins to operate, a duration of operation of said electromechanical subsystem, an operating parameter of said electromechanical subsystem, a environmental condition, a fault condition, an alarm condition, and a directive.

43. The system for managing a plurality of areas of interest within a golf course of claim 42, wherein said operating parameter of said electromechanical subsystem comprises a selected one of an electrical current, a pressure, a vacuum, an air flow, and a water flow.

44. The system for managing a plurality of areas of interest within a golf course of claim 42, wherein said environmental condition comprises a selected one of a soil temperature, an ambient temperature, a moisture content, an amount of solar radiation received in a specified time period, a soil salinity, and a detection of motion.

45. The system for managing a plurality of areas of interest within a golf course of claim 44, wherein said ambient temperature is an ambient air temperature.

46. The system for managing a plurality of areas of interest within a golf course of claim 44, wherein said moisture content is a selected one of a soil moisture content and an air humidity.

47. The system for managing a plurality of areas of interest within a golf course of claim 1, wherein said local control module is implemented as a virtual local control module on said programmable master control module.

48. The system for managing a plurality of areas of interest within a golf course of claim 1, wherein said areas of interest comprise at least a plurality of one or more golf greens, one or more fairways, one or more tee boxes, one or more walkways, one or more gallery viewing areas, one or more driving ranges, one or more putting greens, and one or more practice areas.

* * * * *